United States Patent
Nakahara et al.

(10) Patent No.: US 10,633,497 B2
(45) Date of Patent: Apr. 28, 2020

(54) METHACRYLIC RESIN COMPOSITION, MOLDED ARTICLE, FILM, AND POLARIZING PLATE

(71) Applicant: KURARAY CO., LTD., Kurashiki-shi (JP)

(72) Inventors: Atsuhiro Nakahara, Tainai (JP); Toru Abe, Tainai (JP); Yusaku Nomoto, Tainai (JP)

(73) Assignee: KURRAY CO., LTD., Kurashiki-shi (JP)

( * ) Notice: Subject to any disclaimer, the term of this patent is extended or adjusted under 35 U.S.C. 154(b) by 158 days.

(21) Appl. No.: 15/304,970

(22) PCT Filed: Apr. 16, 2015

(86) PCT No.: PCT/JP2015/002102
§ 371 (c)(1),
(2) Date: Oct. 18, 2016

(87) PCT Pub. No.: WO2015/159552
PCT Pub. Date: Oct. 22, 2015

(65) Prior Publication Data
US 2017/0183463 A1 Jun. 29, 2017

(30) Foreign Application Priority Data

Apr. 18, 2014 (JP) .................. 2014-085965

(51) Int. Cl.
*C08J 5/18* (2006.01)
*C08L 33/12* (2006.01)
(Continued)

(52) U.S. Cl.
CPC ............. *C08J 5/18* (2013.01); *C08L 33/10* (2013.01); *C08L 33/12* (2013.01); *G02B 1/14* (2015.01);
(Continued)

(58) Field of Classification Search
CPC .......... C08L 33/10–33/12; C08L 69/00; C08G 64/00–64/42; G02B 1/14; G02B 5/3033
See application file for complete search history.

(56) References Cited

U.S. PATENT DOCUMENTS 5,280,070 A * 1/1994 Drzewinski ............. C08L 33/12
525/133
5,656,704 A * 8/1997 Wang ...................... C08F 20/14
526/187

(Continued)

FOREIGN PATENT DOCUMENTS

CN 101983221 A 3/2011
JP 57-32942 A 2/1982
(Continued)

OTHER PUBLICATIONS

Combined Chinese Office Action and Search Report dated Nov. 3, 2017 in Patent Application No. 201580020421.3 (with English language translation).

(Continued)

*Primary Examiner* — Prashant J Khatri
(74) *Attorney, Agent, or Firm* — Oblon, McClelland, Maier & Neustadt, L.L.P.

(57) ABSTRACT

A methacrylic resin composition that has high transparency and a small phase difference in the thickness direction, and is easily stretched is provided. A methacrylic resin composition according to the present invention includes a methacrylic resin and a polycarbonate resin, in which the polycarbonate resin has a viscosity-average molecular weight larger than 15,000 and smaller than 32,000, a content of the polycarbonate resin based on 100 pts.mass of the methacrylic resin is no less than 1 pts.mass and no greater than 4 pts.mass, and a total amount of the methacrylic resin and (Continued)

the polycarbonate resin based on the methacrylic resin composition is 80 to 100 mass %.

12 Claims, 1 Drawing Sheet

(51) Int. Cl.
  *G02B 1/14* (2015.01)
  *G02B 5/30* (2006.01)
  *B32B 27/08* (2006.01)
  *B32B 27/36* (2006.01)
  *B32B 27/30* (2006.01)
  *C08L 33/10* (2006.01)

(52) U.S. Cl.
  CPC ............ *G02B 5/3033* (2013.01); *B32B 27/08* (2013.01); *B32B 27/306* (2013.01); *B32B 27/308* (2013.01); *B32B 27/365* (2013.01); *C08J 2333/12* (2013.01); *C08J 2469/00* (2013.01); *C08L 2201/10* (2013.01); *C08L 2203/16* (2013.01); *G02B 5/305* (2013.01)

(56) References Cited

U.S. PATENT DOCUMENTS

| 2011/0086227 A1 | 4/2011 | Minemura et al. |
| 2011/0269910 A1 | 11/2011 | Chun et al. |

FOREIGN PATENT DOCUMENTS

| JP | 5-32846 A | 2/1993 |
| JP | 2002-327012 A | 11/2002 |
| JP | 2004-83833 A | 3/2004 |
| JP | 2009-221386 A | 10/2009 |
| JP | 2012-514759 A | 6/2012 |
| JP | 2013-148655 A | 8/2013 |
| JP | 2014-43562 A | 3/2014 |
| JP | 2014-51649 A | 3/2014 |

OTHER PUBLICATIONS

International Search Report dated Jul. 7, 2015 in PCT/JP2015/002102 filed Apr. 16, 2015.

Office Action dated Jun. 19, 2018 in Japanese Patent Application No. 2016-513649, with unedited computer generated English translation of relevant part, 7 pages.

\* cited by examiner

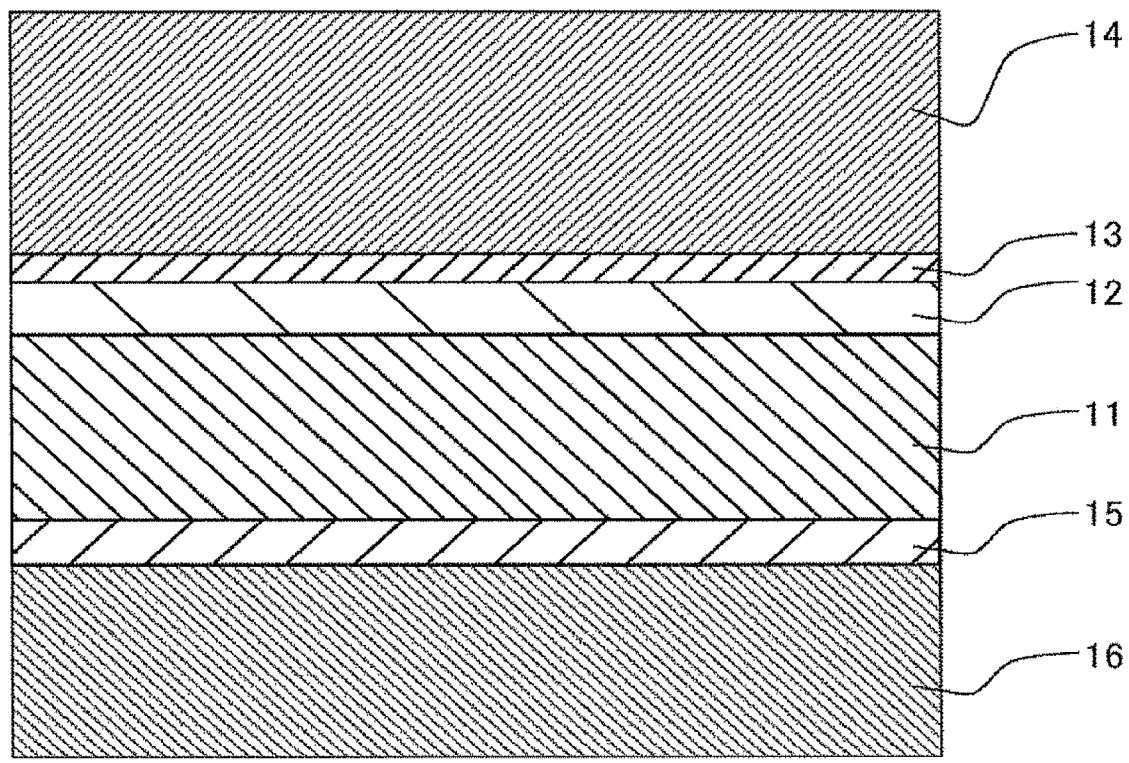

METHACRYLIC RESIN COMPOSITION, MOLDED ARTICLE, FILM, AND POLARIZING PLATE

TECHNICAL FIELD

The present invention relates to a methacrylic resin composition containing a methacrylic resin and a polycarbonate resin. Further, the present invention relates to a film and a molded article made of the methacrylic resin composition and a polarizing plate including the film.

BACKGROUND ART

Various films made of resins are used in liquid crystal display devices. Among them, triacetylcellulose is mainly used for a polarizer protection film. A film made of triacetylcellulose has high moisture permeability. Therefore, the quality of a polarizer tends to deteriorate as the thickness of its protection film is reduced. It has been desired to improve the polarizer protection film in the technique of reducing the thickness of a liquid crystal display device.

Therefore, a methacrylic resin has been studied as a new material for a polarizer protection film. It has been known that when a film made of a methacrylic resin is subjected to a stretching process, its tenacity is increased (see Patent Literature 1). However, when an ordinary methacrylic resin film is stretched, its phase difference increases. As a result, in the case of an IPS liquid crystal method, for example, the quality of a picture deteriorates.

It has been known that by adding a polycarbonate resin or the like in the methacrylic resin, a film having a small phase difference can be obtained more easily (Patent Literature 2-5). However, the above-described methacrylic resin compositions have a problem in their stretching property. Therefore, there has been a problem that when a methacrylic resin composition is formed into a thinner film by stretching, it tends to be cracked more easily. Further, when a methacrylic resin composition is stretched at a lower temperature in order to increase the strength of the film obtained by the stretching, the film tends to rupture more easily.

CITATION LIST

Patent Literature

Patent Literature 1: Japanese Examined Patent Application Publication No. S57-32942
Patent Literature 2: Japanese Unexamined Patent Application Publication No. H5-32846
Patent Literature 3: Japanese Unexamined Patent Application Publication No. 2012-514759
Patent Literature 4: Japanese Unexamined Patent Application Publication No. 2013-148655
Patent Literature 5: Japanese Unexamined Patent Application Publication No. 2014-51649

SUMMARY OF INVENTION

Technical Problem

The present invention has been made in view of the above-described background and an object thereof is to provide a methacrylic resin composition having high transparency and a small phase difference in the thickness direction, and capable of being easily stretched. Further, another object is to provide a film made of a methacrylic resin composition having a uniform thickness, excellent surface smoothness, high productivity, and a high strength.

Solution to Problem

After a series of studies made to achieve the above-described object, the inventors have completed the present invention including the below-shown aspects.

[1]: A methacrylic resin composition including a methacrylic resin and a polycarbonate resin, in which the polycarbonate resin has a viscosity-average molecular weight larger than 15,000 and smaller than 32,000, a content of the polycarbonate resin based on 100 pts.mass of the methacrylic resin is no less than 1 pts.mass and no greater than 4 pts.mass, and a total amount of the methacrylic resin and the polycarbonate resin based on the methacrylic resin composition is 80 to 100 mass %.

[2]: The methacrylic resin composition described in the Item [1], in which a molecular-weight distribution of the methacrylic resin composition is 1.3 to 1.5.

[3]: The methacrylic resin composition described in the Item [1] or [2], in which triad syndiotacticity (rr) of the methacrylic resin is no less than 50% and a content of a structure unit originating in methyl methacrylate in the methacrylic resin is no less than 92 mass % and no greater than 100 mass %.

[4]: The methacrylic resin composition described in any one of the Items [1] to [3], in which a syndiotacticity (rr) of the methacrylic resin is no less than 58% and no greater than 85%.

[5]: The methacrylic resin composition described in any one of the Items [1] to [4], in which a content of a structure unit originating in methyl methacrylate in the methacrylic resin is no less than 99%.

[6]: The methacrylic resin composition described in any one of the Items [1] to [5], in which a weight-average molecular weight of the methacrylic resin composition is 70,000 to 200,000.

[7]: The methacrylic resin composition described in any one of the Items [1] to [6], in which the polycarbonate resin has a viscosity-average molecular weight of greater than 15,000 and less than 18,000.

[8]: A molded article made of a methacrylic resin composition described in any one of the Items [1] to [7].

[9]: A film made of a methacrylic resin composition described in any one of the Items [1] to [7].

[10]: The film described in the Item [9], in which a thickness of the film is 10 to 50 μm.

[11]: The film described in the Item [9] or [10], in which the film is biaxially-stretched to a size of 1.5 to 8 times larger than the original size as expressed in an area ratio.

[12]: The film described in any one of the Items [9] to [11], in which the film is used as a polarizer protection film.

[13]: A polarizing plate in which at least one film described in the Item [12] is laminated thereon.

Advantageous Effects of Invention

According to the present invention, it is possible to provide a methacrylic resin composition having high transparency and a small phase difference in the thickness direction, and capable of being easily stretched. Further, the present invention provides an excellent advantageous effect that a film made of a methacrylic resin composition having a uniform thickness, excellent surface smoothness, high productivity, and a high strength can be provided.

BRIEF DESCRIPTION OF DRAWINGS

FIG. 1 is a cross section showing an example of a polarizing plate according to an exemplary embodiment of the present invention.

DESCRIPTION OF EMBODIMENTS

A methacrylic resin composition according to the present invention includes a methacrylic resin and a polycarbonate resin. Further, a film according to the present invention is a film made of a methacrylic resin composition including a methacrylic resin and a polycarbonate resin.

In a methacrylic resin used in the present invention, the content of a structure unit originating in methyl methacrylate is preferably no less than 92 mass %, more preferably no less than 95 mass %, further preferably no less than 97 mass %, particularly preferably no less than 99 mass %, and most preferably 100 mass % based on the mass of the methacrylic resin in view of the heat resistance of a film obtained therefrom.

A methacrylic resin used in the present invention may include a structure unit other than the structure unit originating in methyl methacrylate. Examples of such a structure unit include a structure unit originating in a vinyl-based monomer having only one polymeric carbon-carbon double bond in one molecule such as: methacrylate alkyl esters other than methyl methacrylate such as ethyl methacrylate, cyclohexyl methacrylate, t-butyl methacrylate, 2-isobornyl methacrylate, 8-tricyclo [5.2.1.0$^{2,6}$] decanyl methacrylate, and 4-t-butylcyclohexyl methacrylate; acrylate alkyl esters such as methyl acrylate, ethyl acrylate, propyl acrylate, butyl acrylate, and 2-ethylhexyl acrylate; acrylate aryl esters such as phenyl acrylate; acrylate cycloalkyl esters such as cyclohexyl acrylate and norbornenyl acrylate; acrylamide; methacrylamide; acrylonitrile; and methacrylonitrile. The content of the structure unit other than the structure unit originating in methyl methacrylate is preferably no greater than 8 mass %, more preferably no greater than 5 mass %, further preferably no greater than 3 mass %, particularly preferably no greater than 1 mass %, and most preferably 0 mass %.

In a methacrylic resin used in the present invention, the lower limit for the triad syndiotacticity (rr) is preferably 50%, more preferably 55%, further preferably 58%, particularly preferably 59%, and most preferably 60%. In the methacrylic resin, the upper limit for the triad syndiotacticity (rr) is preferably 99%, more preferably 85%, further preferably 77%, particularly preferably 65%, and most preferably 64% in view of the film forming property.

The triad syndiotacticity (rr) (hereinafter also expressed simply as a "syndiotacticity (rr)") is a ratio of a state where a chain of two structure units (diad) included in a chain of three consecutive structure units (triad) are both racemo (expressed as "rr"). Note that in a chain of structure units (diad) in a polymer molecule, those in which their configurations are the same as each other are called "meso" and those in which their configurations are opposite to each other are called "racemo". Further, they are expresses as "m" and "r", respectively.

The syndiotacticity (rr) (%) of a methacrylic resin can be obtained by measuring a 1H-NMR spectrum in deuterochloroform at 30° C., measuring (i.e., obtaining) a size (X) of an area of 0.6 to 0.95 ppm and a size (Y) of an area of 0.6 to 1.35 ppm when the TMS is 0 ppm based on the spectrum, and calculating a formula: (X/Y)×100.

The weight-average molecular weight (hereinafter also expressed as "Mw") of a methacrylic resin used in the present invention is preferably no less than 70,000, more preferably 80,000 to 200,000, further preferably 85,000 to 160,000, and particularly preferably 90,000 to 120,000. By adjusting this Mw to 80,000 or larger and adjusting the syndiotacticity (rr) to 50% or higher, an obtained film has a high strength, is less likely to be cracked, and is easily stretched. As a result, the thickness of the film can be reduced even further. Further, when the Mw is no greater than 200,000, the molding/processing property of the methacrylic resin is improved. Therefore, an obtained film tends to have a uniform thickness and excellent surface smoothness.

The ratio of the Mw to the number-average molecular weight (hereinafter also expressed as "Mn") (i.e., the ratio Mw/Mn: hereinafter this ratio is also referred to as "molecular-weight distribution") of a methacrylic resin used in the present invention is preferably 1.2 to 2.0 and more preferably 1.3 to 1.7. By adjusting the molecular-weight distribution to 1.2 or higher, the fluidity of the methacrylic resin is improved. Therefore, an obtained film tends to have excellent surface smoothness. When the molecular-weight distribution is no greater than 2.0, an obtained film tends to have an excellent impact resistance and excellent tenacity. Note that each of the values Mw and Mn is obtained by converting a chromatogram measured by gel permeation chromatography (GPC) into a molecular weight of standard polystyrene.

The melt flow rate of a methacrylic resin used in the present invention is preferably 0.1 to 5 g/10 minutes, more preferably 0.5 to 4 g/10 minutes, and most preferably 1.0 to 3 g/10 minutes as measured under the condition of a load of 3.8 kg and a temperature of 230° C. in conformity to JIS K7210.

The glass transition temperature of a methacrylic resin used in the present invention is preferably no lower than 110° C., more preferably no lower than 118° C., further preferably no lower than 120° C., particularly preferably no lower than 123° C., and most preferably no lower than 124° C. The upper limit for the glass transition temperature of the methacrylic resin is typically 130° C. The glass transition temperature can be adjusted by adjusting the molecule weight and/or the syndiotacticity (rr). When the glass transition temperature is within the aforementioned range, an obtained film is less likely to cause a deformation such as a thermal shrinkage. Note that the glass transition temperature is a middle glass transition temperature measured by a method described later in the example section.

There is no particular restriction on the method for manufacturing a methacrylic resin. For example, a methacrylic resin whose properties such as an Mw and a syndiotacticity (rr) meet desired ranges can be manufactured by using a publicly-known polymerization method such as a radical polymerization method and an anion polymerization method while adjusting the polymerization temperature, the polymerization time, the type and the amount of a chain transfer agent, the type and the amount of a polymerization initiator, and so on.

In the case of the radical polymerization method, for example, the polymerization temperature is preferably no higher than 80° C., more preferably no higher than 70° C., and further preferably no higher than 60° C. By adjusting the temperature as described above, the syndiotacticity (rr) can be easily increased.

In the case of the anion polymerization method, lithium alkyl such as n-butyl lithium, sec-butyl lithium, iso-butyl lithium, and tert-butyl lithium is preferably used as the polymerization initiator. Further, an organoaluminium compound is preferably included together with other substances in view of productivity. Examples of the organoaluminium compound include compounds expressed by the below-shown formula.

(In the formula: each of $R^1$, $R^2$ and $R^3$ is an alkyl group that may include an independent substituent, a cycloalkyl group that may include a substituent, an aryl group that may include a substituent, an aralkyl group that may include a substituent, an alkoxyl group that may include a substituent, an aryloxy group that may include a substituent, or an N,N-disubstituted amino group. $R^2$ and $R^3$ may be an arylenedioxy group that may include a substituent and is formed as they are combined.) Specific examples include isobutylbis(2,6-di-tert-butyl-4-methylphenoxy) aluminum, isobutylbis(2,6-di-tert-butylphenoxy) aluminum, and isobutyl [2,2'-methylenebis(4-methyl-6-tert-butylphenoxy)] aluminum.

Further, in the anion polymerization method, ether and/or a nitrogen-containing compound may be included together with other substances in order to control the polymerization reaction.

Further, when a methacrylic resin is manufactured by the anion polymerization method, its weight-average molecular weight can be adjusted by adding a polymerization terminator in an amount smaller than the amount of the polymerization initiator, more specifically, in an amount of preferably 1 mole % to 50 mole %, more preferably 2 mole % to 20 mole %, and further preferably 5 mole % to 10 mole % based on the amount of the polymerization initiator halfway through the polymerization reaction, and/or additionally adding a polymerization initiator in an amount of preferably 1 mole % to 50 mole %, more preferably 2 mole % to 20 mole %, and further preferably 5 mole % to 10 mole % based on the amount of the originally-added polymerization initiator halfway through the polymerization reaction.

Examples of a second method for obtaining a methacrylic resin having desired properties such as a desired weight-average molecular weight and a desired syndiotacticity (rr) include a method for obtaining a methacrylic resin having desired properties (such as a desired weight-average molecular weight and a desired syndiotacticity (rr)) by mixing a methacrylic resin that does not have desired properties with a methacrylic resin having desired properties, or mixing methacrylic resins that do not have desired properties with each other as appropriate. The production control of such methods is easy. A plurality of types of methacrylic resins can be mixed with each other by using a publicly-known method using a melt kneading device such as a kneader-ruder, an extruder, a mixing roll, and a Banbury mixer. The temperature in the kneading process can be adjusted as appropriate according to the melting temperature of a methacrylic resin to be used and is usually 150° C. to 300° C.

Examples of a third method for obtaining a methacrylic resin having desired properties include a method for manufacturing a methacrylic resin whose properties such as the weight-average molecular weight and the syndiotacticity (rr) meet desired ranges by polymerizing monomers under the presence of a methacrylic resin whose properties do not meet the desired ranges. This polymerization can be carried out in a manner similar to the above-described radical polymerization method and the anion polymerization method. Since the thermal hysteresis for the methacrylic resin in the third manufacturing method is shorter than that of the second manufacturing method, the thermal decomposition of the methacrylic resin is reduced. As a result, a film in which coloring is less likely to occur and which is less likely to contain foreign substances could be obtained.

Among the manufacturing methods of methacrylic resins including the above-described manufacturing methods, in view of the fact that a methacrylic resin having high transparency can be easily manufactured, preferred manufacturing method include: a method for manufacturing a methacrylic resin whose properties meet desired ranges by using an anion polymerization method; a method for manufacturing a methacrylic resin whose properties meet desired ranges by mixing a methacrylic resin manufactured by an anion polymerization method and a methacrylic resin manufactured by a radical polymerization method; and a method for manufacturing a methacrylic resin whose properties meet desired ranges of the present invention by mixing a methacrylic resin manufactured by an anion polymerization method and a methacrylic resin manufactured by another anion polymerization method. Further, a method for manufacturing a methacrylic resin whose properties meet desired ranges of the present invention by mixing a methacrylic resin manufactured by an anion polymerization method and a methacrylic resin manufactured by a radical polymerization method is more preferred.

A polycarbonate resin used in the present invention is a polymer that is obtained by a reaction between a polyfunctional hydroxy compound and a carbonic acid ester-forming compound. This polycarbonate resin is preferably an aromatic polycarbonate resin in view of its compatibility with the methacrylic resin and the fact that an obtained film has excellent transparency.

As the polycarbonate resin used in the present invention, a polycarbonate resin having a viscosity-average molecular weight (hereinafter also expressed as "Mv") of no less than 15,000 is used in view of the fact that the stretching property of a film made of an obtained methacrylic resin composition is high. The value Mv is preferably greater than 15,500, more preferably greater than 15,800, and most preferably greater than 16,000. Further, in view of its compatibility with the methacrylic resin, a polycarbonate resin having a value Mv of no greater than 32,000 is used. The value Mv is preferably smaller than 22,000, more preferably smaller than 19,000, and most preferably smaller than 18,000. The higher the syndiotacticity (rr) of a used methacrylic resin is, the higher its compatibility with a polycarbonate resin becomes. As a result, a polycarbonate resin having a larger viscosity-average molecular weight can be used.

The viscosity-average molecular weight (Mv) of a polycarbonate resin can be obtained by measuring the specific viscosity $\eta_{sp}$ of a solution obtained by dissolving 0.5 g of a polycarbonate resin in 100 mL of methylene chloride at 20° C. by using a Cannon-Fenske viscometer or an Ubbelohde viscometer and calculating a value that satisfies the below-shown Schnell expression from the limiting viscosity [η] of the methylene chloride solution at 20° C.

$$\eta_{sp}/c=[\eta]+0.45\times[\eta]^2 c$$

(Note that [η] is the limiting viscosity, and c=0.5 under the above-described condition.)

$$[\eta]=1.23\times10^{-4}M v^{0.83}$$

Further, the MVR (melt volume flow rate) value of a polycarbonate resin used in the present invention at 300° C. at 1.2 Kg is preferably greater than 1 $cm^3$/10 minutes, more preferably greater than 10 $cm^3$/10 minutes, further preferably greater than 20 $cm^3$/10 minutes, and most preferably greater than 25 $cm^3$/10 minutes in view of the compatibility with the methacrylic resin. Further, in view of the fact that the stretching property of an obtained methacrylic resin composition is high, the MVR value is preferably less than 60 cm³/10 minutes, more preferably less than 51 cm³/10 minutes, further preferably less than 47 cm³/10 minutes, and most preferably less than 44 cm³/10 minutes.

Further, in view of the fact that the stretching property of an obtained methacrylic resin composition is high, the weight-average molecular weight (Mw) of a polycarbonate resin used in the present invention, which is obtained by converting a chromatogram measured by gel permeation chromatography (GPC) into a molecular weight of standard polystyrene, is preferably greater than 30,800 g/mole. The value Mw is preferably greater than 32,100 g/mole, more preferably greater than 32,800 g/mole, and most preferably greater than 33,300 g/mole. Further, in view of the compatibility with the methacrylic resin, the value Mw is preferably less than 75,000 g/mole, more preferably less than 48,400 g/mole, further preferably less than 40,700 g/mole, and most preferably less than 38,200 g/mole.

Note that the viscosity-average molecular weight, the MVR value, and the weight-average molecular weight of a polycarbonate resin can be adjusted by adjusting the amount of an end terminator or a branching agent.

To increase the compatibility with the methacrylic resin and increase the transparency of the methacrylic resin composition, a polycarbonate resin used in the present invention can be adjusted so that it has a viscosity-average molecular weight of greater than 15,000 and less than 32,000 as described above by mixing a polycarbonate resin having a viscosity-average molecular weight of greater than 15,000 and a polycarbonate resin having a viscosity-average molecular weight of less than 12,000.

The glass transition temperature of a polycarbonate resin used in the present invention is preferably no lower than 130° C., more preferably no lower than 135° C., and further preferably no lower than 140° C. The upper limit for the glass transition temperature of the polycarbonate resin is typically 180° C.

There is no particular restriction on the method for manufacturing a polycarbonate resin. Examples of the manufacturing method include a phosgene method (an interface polymerization method) and a melting polymerization method (an ester exchange method). Further, a preferable aromatic polycarbonate resin used in the present invention may be one that is obtained by performing a process for adjusting the amount of a terminal hydroxy group on a polycarbonate resin that is manufactured by a melting polymerization method and used as an ingredient.

Examples of the polyfunctional hydroxy compound, which is an ingredient for manufacturing a polycarbonate resin, include: 4,4'-dihydroxy biphenyls that may include a substituent; bis(hydroxyphenyl) alkanes that may include a substituent; bis(4-hydroxyphenyl) ethers that may include a substituent; bis(4-hydroxyphenyl) sulfides that may include a substituent; bis(4-hydroxyphenyl) sulfoxides that may include a substituent; bis(4-hydroxyphenyl) sulfones that may include a substituent; bis(4-hydroxyphenyl) ketones that may include a substituent; bis(hydroxyphenyl) fluorenes that may include a substituent; dihydroxy-p-terphenyls that may include a substituent; dihydroxy-p-quaterphenyls that may include a substituent; bis(hydroxyphenyl) pyrazines that may include a substituent; bis(hydroxyphenyl) menthanes that may include a substituent; [2-(4-hydroxyphenyl)-2-propyl] benzenes that may include a substituent; dihydroxynaphthalenes that may include a substituent; dihydroxybenzenes that may include a substituent; polysiloxanes that may include a substituent; and dihydro perfluoroalkanes that may include a substituent.

Among these polyfunctional hydroxy compounds, 2,2-bis (4-hydroxyphenyl) propane, 1,1-bis(4-hydroxyphenyl) cyclohexane, bis(4-hydroxyphenyl) diphenyl methane, 1,1-bis(4-hydroxyphenyl)-1-phenylethane, 2,2-bis(4-hydroxy-3-methylphenyl) propane, 2,2-bis(4-hydroxy-3-phenylphenyl) propane, 4,4'-dihydroxybiphenyl, bis(4-hydroxyphenyl) sulfone, 2,2-bis(3,5-dibromo-4-hydroxyphenyl) propane, 3,3-bis(4-hydroxyphenyl) pentane, 9,9-bis(4-hydroxy-3-methylphenyl) fluorene, bis (4-hydroxyphenyl) ether, 4,4'-dihydroxybenzophenone, 2,2-bis(4-hydroxy-3-methoxyphenyl) 1,1,1,3,3,3-hexafluoropropane, α,ω-bis[3-(2-hydroxyphenyl) propyl] polydimethylsiloxane, resorcin, and 2,7-dihydroxynaphthalene are preferred. In particular, 2,2-bis(4-hydroxyphenyl) propane is preferred.

Examples of the carbonic acid ester-forming compound include various dihalogenated carbonyls such as phosgene, haloformate such as chloroformate, and carbonic acid ester compounds such as bisarylcarbonate. The amount of this carbonic acid ester-forming compound may be adjusted as appropriate in consideration of the stoichiometry ratio (equivalent) of the reaction.

The reaction is typically carried out in a solvent under the presence of an acid bonding agent. Examples of the acid bonding agent include alkali metal hydroxides such as sodium hydroxide, potassium hydroxide, lithium hydroxide and cesium hydroxide, alkali metal carbonates such as sodium carbonate and potassium carbonate, tertiary amines such as trimethylamine, triethylamine, tributylamine, N,N-dimethylcyclohexylamine, pyridine and dimethylaniline, quaternary ammonium salts such as trimethylbenzyl ammonium chloride, triethylbenzyl ammonium chloride, tributylbenzyl ammonium chloride, trioctylmethyl ammonium chloride, tetrabutyl ammonium chloride and tetrabutyl ammonium bromide, and quaternary phosphonium salts such as tetrabutyl phosphonium chloride and tetrabutylphosphonium bromide. Further, if desired, a small amount of an antioxidant such as sodium sulfite and hydrosulfite may be added to this reaction system. The amount of the acid bonding agent may be adjusted as appropriate in consideration of the stoichiometry ratio (equivalent) of the reaction. Specifically, the acid bonding agent may be used in an amount of 1 equivalent or larger for 1 mole of the hydroxyl group of the polyfunctional hydroxy compound used as an ingredient. Preferably, the acid bonding agent may be used in an amount of 1 to 5 equivalents for 1 mole of the hydroxyl group of the polyfunctional hydroxy compound.

Further, a publicly-known end terminator and/or a branching agent can be used for the reaction. Examples of the end terminator include p-tert-butyl-phenol, p-phenylphenol, p-cumylphenol, p-perfluorononyl phenol, p-(perfluorononyl phenyl) phenol, p-(perfluorohexyl phenyl) phenol, p-tert-perfluorobutyl phenol, 1-(P-hydroxybenzyl) perfluorodecane, p-[2-(1H,1H-perfluorotridodecyl oxy)-1,1,1,3,3,3-hexafluoro propyl] phenol, 3,5-bis(perfluorohexyl oxy carbonyl) phenol, p-hydroxybenzoate perfluorododecyl, p-(1H,1H-perfluorooctyl oxy) phenol, 2H,2H,9H-perfluorononanoic acid, and 1,1,1,3,3,3 tetorafuroro-2-propanol.

Examples of the branching agent include phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl) heptane, 1,3,5-tris(2-hydroxyphenyl) benzene, 1,3,5-tris(4-hydroxyphenyl) benzene, 1,1,1-tris(4-hydroxyphenyl) ethane, tris(4-hydroxyphenyl) phenyl methane, 2,2-bis [4,4-bis(4-hydroxyphenyl) cyclohexyl] propane, 2,4-bis[2-bis(4-hydroxyphenyl)-2-propyl] phenol, 2,6-bis(2-hydroxy-5-methylbenzyl)-4-methylphenol, 2-(4-hydroxyphenyl)-2-(2,4-dihydroxyphenyl) propane, tetrakis(4-hydroxyphenyl) methane, tetrakis[4-(4-hydroxyphenyl isopropyl) phenoxy] methane, 2,4-dihydroxybenzoic acid, trimesic acid, cyanuric acid, 3,3-bis(3-methyl-4-hydroxyphenyl)-2-oxo-2, 3-dihydroindole, 3,3-bis(4-hydroxyaryl) oxindole, 5-chloroisatin, 5,7-dichloroisatin, and 5-bromoisatin.

The polycarbonate resin may be one that contains a unit having a polyester structure, a polyurethane structure, a polyether structure, or a polysiloxane structure in addition to the polycarbonate structure.

The amount of a polycarbonate resin contained in a methacrylic resin composition used in the present invention is preferably no less than 1 pts.mass and no greater than 4 pts.mass, more preferably no less than 2 pts.mass and no greater than 4 pts.mass, and further preferably no less than 2 pts.mass and no greater than 3 pts.mass based on the 100 pts.mass of the methacrylic resin.

The total amount of a methacrylic resin and a polycarbonate resin contained in a methacrylic resin composition used in the present invention is 80 to 100 mass %, preferably 90 to 100 mass %, more preferably 94 to 100 mass %, and further preferably 96 to 100 mass % based on the methacrylic resin composition.

A methacrylic resin composition according to the present invention may include a filler as required as long as the effect of the present invention is not impaired. Examples of the filler include calcium carbonate, talc, carbon black, titanium oxide, silica, clay, barium sulfate, and magnesium carbonate. The amount of a filler that can be contained in a methacrylic resin composition according to the present invention is preferably no greater than 3 mass % and more preferably no greater than 1.5 mass %.

A methacrylic resin composition according to the present invention may include other polymers as long as the effect of the present invention is not impaired. Examples of the other polymers include: polyolefin resins such as polyethylene, polypropylene, polybutene-1, poly-4-methylpentene-1, and polynorbornene; ethylene-based ionomers; styrene-based resins such as polystyrene, styrene-maleic anhydride copolymers, high-impact polystyrene, AS resins, ABS resins, AES resins, AAS resins, ACS resins, and MBS resins; methyl methacrylate-styrene copolymers; polyester resins such as polyethylene terephthalate and polybutylene terephthalate; polyamides such as nylon 6, nylon 66, and polyamide elastomers; polyvinyl chloride, polyvinylidene chloride, polyvinyl alcohol, ethylene-vinyl alcohol copolymers, polyacetal, polyvinylidene fluoride, polyurethane, denatured polyphenylene ether, polyphenylene sulfide, and silicone-modified resins; acrylic rubber, silicone rubber; styrene-based thermoplastic elastomers such as SEPS, SEBS and SIS; and olefin-based rubber such as IR, EPR and EPDM. The amount of the other polymers that can be contained in a methacrylic resin composition according to present invention is preferably no greater than 10 mass %, more preferably no greater than 5 mass %, and most preferably 0 mass %.

A methacrylic resin composition according to the present invention may contain additives such as an antioxidant, a thermal degradation preventing agent, an ultraviolet absorber, a light stabilizer, a lubricant, a mold release agent, a polymer processing aid, an antistatic agent, a flame retardant, a dye/pigment, a light diffusing agent, an organic dye, a matting agent, an impact-resistance modifier, and a phosphor as long as the effect of the present invention is not impaired.

The antioxidant is an agent that has, as used alone, an effect of preventing the oxidation of a resin under the presence of oxygen. Examples of the antioxidant include a phosphorus-based antioxidant, a hindered phenol-based antioxidant, and a thioether-based antioxidant. Among them, the phosphorus-based antioxidant and the hindered phenol-based antioxidant are preferred in view of the effect of preventing the deterioration of optical properties caused by the coloring. Further, the combined use of the phosphorus-based antioxidant and the hindered phenol-based antioxidant is more preferred.

When the combination of the phosphorus-based antioxidant and the hindered phenol-based antioxidant is used, the mass ratio "(phosphorus-based antioxidant)/(hindered phenol-based antioxidant)" is preferably 0.2/1 to 2/1, and more preferably 0.5/1 to 1/1.

Examples of the phosphorus-based antioxidant include 2,2-methylenebis(4,6-di-tert-butylphenyl) octylphosphite (Trade name: ADK STAB HP-10 manufactured by ADEKA Corporation), tris(2,4-di-tert-butylphenyl) phosphite (Trade name: IRGAFOS 168 manufactured by BASF Corporation), and 3,9-bis(2,6-di-tert-butyl-4-methylphenoxy)-2,4,8,10-tetraoxa-3,9-diphosphaspiro[5.5] undecane (Trade name: ADK STAB PEP-36 manufactured by ADEKA Corporation).

Preferred examples of the hindered phenol-based antioxidant include pentaerythrityl-tetrakis[3-(3,5-di-tert-butyl-4-hydroxyphenyl) propionate] (Trade name IRGANOX 1010 manufactured by BASF Corporation) and octadecyl-3-(3,5-di-tert-butyl 4-hydroxyphenyl) propionate (Trade name IRGANOX1076 manufactured by BASF Corporation).

An example of the thermal degradation preventing agent is one that can prevent the thermal degradation of a resin by trapping a polymer radical that is caused when the resin is exposed to a high temperature in a substantially oxygen-free state.

Preferred examples of the thermal degradation preventing agent include 2-tert-butyl-6-(3'-tert-butyl-5'-methyl-hydroxybenzyl)-4-methylphenyl acrylate (Trade name Sumilizer GM manufactured by Sumitomo Chemical Co., Ltd.) and 2,4-ditert-amyl-6-(3',5'-di-tert-amyl-2'-hydroxy-α-methyl benzyl) phenyl acrylate (Trade name Sumilizer GS manufactured by Sumitomo Chemical Co., Ltd.).

The ultraviolet absorber is a compound capable of absorbing ultraviolet rays and is one that is considered to mainly have a function of converting optical energy into thermal energy. Examples of the ultraviolet absorber include benzophenones, benzotriazoles, triazines, benzoates, salicylates, cyanoacrylates, oxalic anilides, malonic esters, and formamidines. Among them, benzotriazoles, triazines, and ultraviolet absorbers of which the maximum value $\varepsilon_{max}$ of the molar absorption coefficient in a wavelength range of 380 to 450 nm is no greater than 100 $dm^3 \cdot mol^{-1} \, cm^{-1}$ are preferred.

Since benzotriazoles have an excellent effect of preventing the deterioration of optical properties due to the coloring caused by ultraviolet irradiation, they are preferred as the ultraviolet absorber when the film according to the present invention is used for optical purposes. Preferred examples of the benzotriazoles include 2-(2H-benzotriazol-2-yl)-4-(1,1,3,3-tetramethylbutyl) phenol (Trade name TINUVIN329 manufactured by BASF Corporation), 2-(2H-benzotriazol-2-yl)-4,6-bis(1-methyl-1-phenylethyl) phenol (Trade name TINUVIN234 manufactured by BASF Corporation), and 2,2'-methylenebis[6-(2H-benzotriazol-2-yl)-4-tert-octylphenol] (LA-31 manufactured by ADEKA Corporation).

Further, an ultraviolet absorber of which the maximum value $\varepsilon_{max}$ of the molar absorption coefficient in a wavelength range of 380 to 450 nm is no greater than 1,200 dm$^3$·mol$^{-1}$ cm$^{-1}$ can suppress the coloring of an obtained film. Examples of such an ultraviolet absorber include 2-ethyl-2'-ethoxy-oxalanilide (Trade name Sandeyuboa VSU manufactured by Clariant Japan Corporation).

Among these ultraviolet absorbers, the use of benzotriazoles is preferred in view of the fact that the degradation of the resin caused by ultraviolet irradiation can be suppressed.

Further, when it is desired to effectively absorb wavelengths at and near a wavelength of 380 nm, the use of triazines as the ultraviolet absorber is preferred. Examples of such an ultraviolet absorber include 2,4,6-tris(2-hydroxy-4-hexyloxy-3-methylphenyl)-1,3,5-triazine (LA-F70 manufactured by ADEKA Corporation) and hydroxyphenyl triazine-based ultraviolet absorbers (Trade named TINUVIN477 and TINUVIN460 manufactured by BASF Corporation), which are analogues of the aforementioned ultraviolet absorber.

Note that the maximum value $\varepsilon_{max}$ of the molar absorption coefficient of an ultraviolet absorber is measured as follows. Firstly, 10.00 mg of an ultraviolet absorber is added and dissolved in 1 L of cyclohexane so that no undissolved substance is present in visual observation. This solution is injected into a quartz grass cell having a size of 1 cm×1 cm×3 cm. Then, an absorbance in a wavelength range of 380 to 450 nm in an optical path length of 1 cm is measured by using a U-3410-type spectrophotometer manufactured by Hitachi, Ltd. The maximum value $\varepsilon_{max}$ of the molar absorption coefficient is calculated from the molecular weight ($M_{UV}$) of the ultraviolet absorber and the maximum value ($A_{max}$) of the absorbance by using the below-shown expression.

$$\varepsilon_{max}=[A_{max}/(10\times10-3)]\times M_{UV}$$

The light stabilizer is a compound that is considered to mainly have a function of trapping a radical that is generated by oxidation caused by light. Examples of a preferred light stabilizer include hindered amines such as a compound having a 2,2,6,6-tetraalkylpiperidine skeleton.

Examples of the lubricant include stearic acid, behenic acid, stearamide acid, methylene bisstearamide, hydroxystearic acid triglyceride, paraffin wax, ketone wax, octyl alcohol, and hydrogenated oil.

The mold release agent is a compound having a function of making the removal of a molded article from a die easier. Examples of the mold release agent include: higher alcohols such as cetyl alcohol and stearyl alcohol; and glycerin higher fatty acid esters such as monoglyceride stearate and diglyceride stearate. In the present invention, the combined use of a higher alcohol and glycerin fatty acid monoester is preferred as the mold release agent. When the combination of a higher alcohol and glycerin fatty acid monoester is used, the mass ratio "(higher alcohol)/(glycerin fatty acid monoester)" is preferably in a range of 2.5/1 to 3.5/1, and more preferably in a range of 2.8/1 to 3.2/1.

Examples of the polymer processing aid include, in general, polymer particles having a particle diameter of 0.05 to 0.5 µm that can produced by an emulsion polymerization method. The polymer particles may be single-layer particles consisting of a polymer having a single composition ratio and a single limiting viscosity or may be multi-layer particles consisting of at least two types of polymers having different composition ratios or different limiting viscosities. Among them, examples of preferred particles include two-layer structure particles having an inner polymer layer having a low limiting viscosity and an outer polymer layer having a high limiting viscosity no less than 5 dL/g. The limiting viscosity of the polymer processing aid is preferably 3 to 6 dL/g. Specific examples include a Metablen-P series manufactured by Mitsubishi Rayon Co., Ltd. and a Paraloid series manufactured by Rohm and Haas Company.

Examples of the impact-resistance modifier include: a core shell-type modifier containing acryl-based rubber or diene-based rubber as a core layer component; and a modifier containing a plurality of rubber particles.

As the organic dye, a compound having a function of converting ultraviolet rays, which is considered to be harmful to the resin, into visible light is preferably used.

Examples of the light diffusing agent and the matting agent include fine glass particles, fine polysiloxane-based cross-linking particles, cross-linking polymer particles, talc, calcium carbonate, and barium sulfate.

Examples of the phosphor include fluorescent pigments, fluorescent dyes, white fluorescent dyes, fluorescent whiteners, and fluorescent bleaching agents.

Only one type of these additives may be used. Alternatively, at least two types of the additives may be combined and used together. Further, these additives may be added in a polymerization reaction solution when a methacrylic resin or a polycarbonate resin is manufactured or may be added in the manufactured methacrylic resin or the polycarbonate resin. Alternatively, the additive may be added when a methacrylic resin composition is prepared (or manufactured). To prevent the defective external appearance of a film, the total amount of additives contained in a methacrylic resin composition according to the present invention is preferably no greater than 7 mass %, more preferably no greater than 5 mass %, and further preferably no greater than 4 mass % based on the total amount of the methacrylic resin and the polycarbonate resin.

There is no particular restriction on the method for preparing (or manufacturing) a methacrylic resin composition. Examples of the method includes a method for generating a methacrylic resin by polymerizing a monomer mixture containing methyl methacrylate under the presence of a polycarbonate resin and a method for melting and kneading a methacrylic resin and a polycarbonate resin. Among them, the melting and kneading method is preferred because its process is simple. If necessary, other polymers and additives may be mixed in the melting and kneading process. Alternatively, other polymers and additives may be first mixed with a methacrylic resin and then the mixture may be mixed with a polycarbonate resin, or other polymers and additives may be first mixed with a polycarbonate resin and then the mixture may be mixed with a methacrylic resin. The mixing can be performed by using, for example, a publicly-known mixing device or a mixing/kneading device such as a kneader-ruder, an extruder, a mixing roll, and a Banbury mixer. Among them, a twin screw extruder is preferred. The temperature in the mixing/kneading process can be adjusted as appropriate according to the melting temperatures of a methacrylic resin and a polycarbonate resin to be used and is preferably 110° C. to 300° C. A methacrylic resin composition prepared by the above-described method can be formed into arbitrary shapes such as pellets, granules, and a powder, and then molded into various molded articles including films.

The glass transition temperature of a methacrylic resin composition according to the present invention is preferably no lower than 120° C., more preferably no lower than 123°

C., and further preferably no lower than 124° C. There is no particular restriction on the upper limit for the glass transition temperature of the methacrylic resin composition and the upper limit for the glass transition temperature is typically 135° C.

The value Mw of a methacrylic resin composition used in the present invention that is determined by measuring the methacrylic resin composition by GPC is preferably 70,000 to 200,000, more preferably 72,000 to 160,000, and further preferably 75,000 to 120,000. The molecular weight distribution of a methacrylic resin composition used in the present invention that is determined by measuring the methacrylic resin composition by GPC is preferably 1.2 to 2.5, more preferably 1.3 to 2.0 and further preferably 1.3 to 1.5. When the Mw and the molecular weight distribution is within the aforementioned ranges, the molding/processing property of the methacrylic resin composition is improved and hence a molded article having an excellent impact resistance and excellent tenacity can be easily obtained.

The melt flow rate of a methacrylic resin composition used in the present invention that is determined by measuring the methacrylic resin composition under the condition of a load of 3.8 kg and a temperature of 230° C. is preferably 0.1 to 6 g/10 minutes, more preferably 0.5 to 5 g/10 minutes, and most preferably 1.0 to 3 g/10 minutes.

The haze of a methacrylic resin composition according to the present invention in a thickness of 3.2 mm is preferably no greater than 3.0%, more preferably no greater than 2.0%, and further preferably no greater than 1.5%.

There is no particular restriction on the method for manufacturing a film according to the present invention. For example, a film according to the present invention can be manufactured by forming a film from the aforementioned methacrylic resin composition by using, for example, a publicly-known method such as a solution casting method, a melt flow-casting method, an extrusion method, an inflation molding method, and a blow molding method. Among them, the extrusion method is preferred. By using the extrusion method, a film having excellent transparency, improved tenacity, an excellent handling property, and an excellent balance among the tenacity, the surface hardness, and the rigidity can be obtained. The temperature of the methacrylic resin composition discharged from the extruder is preferably set to 160 to 270° C. and more preferably set to 220 to 260° C.

Among the extrusion methods, a method in which a methacrylic resin composition is extruded from a T-die in a molten state and then the extruded methacrylic resin composition is molded by sandwiching it by two or more mirror-surface roles or mirror-surface belts is preferred in view of the fact that a film having excellent surface smoothness, an excellent mirror-surface luster, and a low haze can be obtained. The mirror-surface roles or mirror-surface belts are preferably made of metal. The linear pressure between a pair of mirror-surface roles or mirror-surface belts is preferably no less than 10 N/mm and more preferably no less than 30 N/mm.

Further, the surface temperature of the mirror-surface roles or mirror-surface belts is preferably no higher than 130° C. Further, the surface temperature of at least one of the pair of mirror-surface roles or mirror-surface belts is preferably no lower than 60° C. By setting the surface temperature to the aforementioned temperature, the methacrylic resin composition extruded from the extruder can be cooled more quickly than being cooled by natural cooling and hence a film having excellent surface smoothness and a low haze can be easily manufactured.

A film according to the present invention may be subjected to a stretching process. By the stretching process, a film that has an improved mechanical strength and hence is less likely to be cracked can be obtained. There is no particular restriction on the stretching method. Examples of the stretching method include a uniaxial stretching method, a simultaneous biaxial stretching method, a successive biaxial stretching method, and a tubular stretching method. In view of the fact that a film capable of being uniformly stretched and having a high strength can be obtained, the temperature in the stretching process is preferably 100 to 200° C. and more preferably 120 to 160° C. Further, when it is desired to increase especially the strength, a low temperature is preferred. For example, the temperature is preferably 110 to 150° C. and more preferably 125 to 140° C. The stretching is typically performed at a rate of 100 to 5,000%/minute in terms of the length. A film whose thermal shrinkage is small can be obtained by carrying out heat settling and/or slackening the film after the stretching. There is no restriction on the ratio at which the film is stretched (hereinafter called a "stretching ratio"). However, the stretching ratio is typically 1.5 to 8 as expressed as an area ratio.

In view of the transparency and the fact that the phase difference in the thickness direction is small, the amount of the methacrylic resin contained in a film according to the present invention is preferably 78 to 99 mass % and more preferably 85 to 97 mass %

Further, in view the fact that the phase difference in the thickness direction is small, the amount of the polycarbonate resin contained in a film according to the present invention is preferably 1 to 3.8 mass % and more preferably 2 to 2.9 mass %.

There is no particular restriction on the thickness of a film according to the present invention. However, when the film is used as an optical film, the thickness of the film is preferably 1 to 300 μm, more preferably 10 to 50 μm, and further preferably 15 to 40 μm.

The haze of a film according to the present invention in a thickness of 50 μm is preferably no greater than 0.2% and more preferably no greater than 0.1%. As a result, the film has an excellent surface luster and transparency. Further, for the use for optical purposes such as a liquid crystal protection film and a light-guiding film, the use efficiency of a light source is improved and hence the above-described feature is preferred. Further, when surface shaping is performed, the shaping accuracy is excellent and hence the above-described feature is preferred.

The in-surface direction phase difference Re of a film according to the present invention for light having a wavelength 590 nm is preferably no less than −5 nm and no greater than 5 nm, more preferably no less than −4 nm and no greater than 4 nm, further preferably no less than −3 nm and no greater than 3 nm, particularly preferably no less than −2 nm and no greater than 2 nm, and most preferably no less than −1 nm and no greater than 1 nm when the thickness of the film is 40 μm.

The thickness direction phase difference Rth of a film according to the present invention for light having a wavelength 590 nm is preferably no less than −5 nm and no greater than 5 nm, more preferably no less than −4 nm and no greater than 4 nm, further preferably no less than −3 nm and no greater than 3 nm, particularly preferably no less than −2 nm and no greater than 2 nm, and most preferably no less than −1 nm and no greater than 1 nm when the thickness of the film is 40 μm.

When the in-surface phase difference and the thickness direction phase difference are within the aforementioned ranges, the influence on the displaying characteristic of an image display device caused by the phase differences can be remarkably reduced. More specifically, interference unevenness and a distortion in a 3D image, when the film is used for a 3D display liquid crystal display device, can be remarkably reduced.

Note that the in-surface phase difference Re and the thickness direction phase difference Rth are values defined by the below-shown expressions, respectively.

$$Re = (nx - ny) \times d$$

$$Rth = ((nx + ny)/2 - nz) \times d$$

In the expressions: nx is a refractive index in a delayed-phase axis direction of the film; ny is a refractive index in an advanced-phase axis direction of the film; nz is a refractive index in a thickness direction of the film, and d (nm) is a thickness of the film. The delayed-phase axis means a direction in which the refractive index in the film surface is maximized and the advanced-phase axis means a direction perpendicular to the delayed-phase axis in the surface.

Since a film according to the present invention has high transparency, a high heat resistance, a small phase difference, and a small thickness, it is suitable for polarizer protection films, various types of films (which will be described later), molded articles, and so on.

A polarizing plate according to the present invention includes at least one polarizer protection film according to the present invention. A polarizing plate according to the present invention is preferably obtained by laminating a polarizer formed from a polivinyl alcohol-based resin and a polarizer protection film according to the present invention with an adhesive layer interposed therebetween.

As shown in FIG. 1, a polarizing plate according to a preferred exemplary embodiment of the present invention is obtained by laminating an adhesive layer 12, an easy adhesive layer 13, and a polarizer protection film 14 according to the present invention in this order on one surface of a polarizer 11, and laminating an adhesive layer 15 and an optical film 16 in this order on the other surface of the polarizer 11.

The above-described polarizer formed from a polivinyl alcohol-based resin is obtained by, for example, dyeing a film made of the polivinyl alcohol-based resin with a dichromatic substance (typically, iodine or a dichromatic dye) and uniaxially-stretching the dyed film. The film made of the polivinyl alcohol-based resin (hereinafter referred to as a "polivinyl alcohol-based resin film") can be obtained by forming a film from the polivinyl alcohol-based resin by using an arbitrary appropriate method (such as a flow-casting method in which a film is formed by feeding and casting a solution obtained by dissolving the resin in water or an organic solvent, a casting method, and an extrusion method). The degree of polymerization (hereinafter called a "polymerization level") of the polivinyl alcohol-based resin is preferably 100 to 5,000 and more preferably 1,400 to 4,000. Further, the thickness of the polivinyl alcohol-based resin film used for a polarizer can be set as appropriate according to the purpose or the use of an LCD in which a polarizing plate is used. However, the thickness of the polivinyl alcohol-based resin film is typically 5 to 80 μm.

As a method for manufacturing a polarizer, an arbitrary appropriate method can be used according to the purpose, the used material, the condition, and the like. Typically, a method that is useful for performing a series of manufacturing processes including processes of swelling, dyeing, cross-lining, stretching, water-washing, and drying the aforementioned polivinyl alcohol-based resin film is used. Each of the processes except for the drying process is carried out by submerging the polivinyl alcohol-based resin film in a bath containing a solution used for the respective process. The order and the number of times the processes of swelling, dyeing, cross-lining, stretching, water-washing, and drying are performed can be determined as appropriate according to the purpose, the used material, the condition, and the like. Further, whether each process should be carried out or omitted can also be determined as appropriate according to the purpose, the used material, the condition, and the like. For example, some of these processes may be simultaneously carried out as one process. Further, a certain process may be omitted. More specifically, for example, the stretching process may be performed after the dyeing process or before the dyeing process. Alternatively, the stretching process may be performed simultaneously with the swelling process, the dyeing process, and the cross-linking process. Further, for example, whether the cross-linking process can be performed before or after the stretching process can be determined as appropriate. Further, for example, the water-washing process may be performed after all the other processes or may be performed only after a certain process.

The swelling process is typically carried out by submersing the aforementioned polivinyl alcohol-based resin film in a processing bath (a swelling bath) filled with water. By this process, dirt and a blocking prevention agent are washed out from the surface of the polivinyl alcohol-based resin film. Further, by swelling the polivinyl alcohol-based resin film, unevenness such as dyeing unevenness can be prevented. Glycerin, potassium iodide, and/or the like can be added as appropriate in the swelling bath. The temperature of the swelling bath is typically 20 to 60° C. and the submerging time in the swelling bath is typically about 0.1 to 10 minutes.

The dyeing process is typically carried out by submersing the aforementioned polivinyl alcohol-based resin film in a processing bath (a dyeing bath) containing a dichromatic substance such as iodine. The typical solvent used as the solution of the dyeing bath is water. However, an organic solvent having compatibility with water may be added in an appropriate amount. The dichromatic substance is typically used in a ratio of 0.1 to 1.0 pts.wt. based on 100 pts.mass of the solvent. When iodine is used as the dichromatic substance, the solution of the dyeing bath preferably contains an auxiliary (or an aid) such as an iodide. This is because the dyeing efficiency is improved. The auxiliary is preferably used in a ratio of 0.02 to 20 pts.mass and more preferably in a ratio of 2 to 10 pts.mass based on 100 pts.mass of the solvent. Specific examples of the iodide include potassium iodide, lithium iodide, sodium iodide, zinc iodide, aluminum iodide, lead iodide, copper iodide, barium iodide, calcium iodide, tin iodine, and titanium iodide. The temperature of the dyeing bath is typically about 20 to 70° C. and the submerging time in the dyeing bath is typically about 1 to 20 minutes.

The cross-linking process is typically carried out by submersing the aforementioned polivinyl alcohol-based resin film, which has been subjected to the above-described dyeing process, in a processing bath (a cross-linking bath) containing a cross-linking agent. An arbitrary appropriate cross-linking agent can be used as the cross-linking agent. Examples of the cross-linking agent include boron compounds such as boric acid and borax, glyoxal, and glutaraldehyde. Only one of these cross-linking agents may be used, or some of them may be combined and used together. The typical solvent used as the solution of the cross-linking bath is water. However, an organic solvent having compatibility with water may be added in an appropriate amount. The cross-linking agent is typically used in a ratio of 1 to 10 pts.mass based on 100 pts.mass of the solvent. When the concentration of the cross-linking agent is less than 1 pts.wt., a satisfactory optical characteristic will probably not be achieved. When the concentration of the cross-linking agent is greater than 10 pts.mass, a stretching force that occurs when the film is stretched increases and an obtained polarizing plate could be shrunk (or contracted). The solution of the cross-linking bath preferably contains an auxiliary such as an iodide. This is because a uniform characteristic can be achieved more easily in the surface. The concentration of the auxiliary is preferably 0.05 to 15 wt. % and more preferably 0.5 to 8.0 wt. %. Specific examples of the iodide are similar to those used in the dyeing process. The temperature of the cross-linking bath is typically about 20 to 70° C. and preferably 40 to 60° C. The submerging time in the cross-linking bath is typically about 1 second to 15 minutes and preferably 5 seconds to 10 minutes.

As described above, the stretching process may be performed at any stage of the manufacturing process. Specifically, the stretching process may be performed after the dyeing process or before the dyeing process. Alternatively, the stretching process may be performed simultaneously with the swelling process, the dyeing process, and the cross-linking process or may be performed after the cross-linking process. The cumulative stretching ratio of the polivinyl alcohol-based resin film needs to be at least 5, and is preferably 5 to 7 and more preferably 5 to 6.5. When the cumulative stretching ratio is less than 5, it could be very difficult to obtain a polarizing plate having a high degree of polarization. When the cumulative stretching ratio is greater than 7, the obtained polivinyl alcohol-based resin film (the polarizer) possibly tend to rupture more easily. As a specific stretching method, an arbitrary appropriate method can be used. For example, when a wet stretching method is used, the polivinyl alcohol-based resin film is stretched in a processing bath (a stretching bath) with a predetermined stretching ratio. As the solution of the stretching bath, a solution that is obtained by adding a metal salt, an iodine compound, a boron compound, or a zinc compound in a solvent such as water or an organic solvent (such as ethanol) is preferably used.

The water-washing process is typically carried out by submersing the aforementioned polivinyl alcohol-based resin film, which has been subjected to the above-described various processes, in a processing bath (a water-washing bath). Unnecessary remaining substances can be washed out from the polivinyl alcohol-based resin film by the water-washing process. The water-washing bath may be pure water or an aqueous solution of an iodide (such as potassium iodide and sodium iodide). The concentration of the iodide aqueous solution is preferably 0.1 to 10 mass %. An auxiliary such as zinc sulfate and zinc chloride may be added in the iodide aqueous solution. The temperature of the water-washing bath is preferably 10 to 60° C. and more preferably 30 to 40° C. The submerging time is typically about 1 second to 1 minute. The water-washing process may be performed only once or may be performed a plurality of times as required. When the water-washing process is performed a plurality of times, the type and/or the concentration of an additive(s) contained in the water-washing process used in each of the water-washing processes can be adjusted as appropriate. For example, the water-washing process includes a process of submerging the polymer film in a potassium iodide aqueous solution (0.1 to 10 mass %, 10 to 60° C.) for 1 second to 1 minute and a process of rinsing the polymer film with pure water.

As the drying process, an arbitrary appropriate drying method (such as natural drying, air-blowing drying, and heated-air drying) can be used. For example, in the case of the heated-air drying, the drying temperature is typically 20 to 80° C. and the drying time is typically 1 to 10 minutes. Through the above-described processes, a polarizer is obtained.

There is no particular restriction on the adhesive layer that can be provided in a polarizing plate according to the present invention, provided that the adhesive layer is optically transparent. Examples of a usable adhesive that forms an adhesive layer include water-based adhesives, solvent-based adhesives, hot-melt-based adhesives, and active energy ray curable adhesives. Among them, the water-based adhesives and active energy ray curable adhesives are preferred.

There is no particular restriction on the water-based adhesive. However, examples of the water-based adhesive include vinyl polymer-based adhesives, gelatin-based adhesives, vinyl and latex-based adhesives, polyurethane-based adhesives, isocyanate-based adhesives, polyester-based adhesives, and epoxy-based adhesives. A cross-linking agent, other additives, and/or a catalyst such as an acid can be mixed with the water-based adhesives as required. As the water-based adhesive, an adhesive containing a vinyl polymer is preferably used. A preferred vinyl polymer is a polivinyl alcohol-based resin. The polivinyl alcohol-based resin may contain an aqueous cross-linking agent such as boric acid, borax, glutaraldehyde, melamine, and oxalic acid. In particular, when polivinyl alcohol-based polymer film is used as a polarizer, an adhesive containing a polivinyl alcohol-based resin is preferably used in view of the adhesiveness. Further, an adhesive containing a polivinyl alcohol-based resin having an acetoacetyl group is more preferred in view of the fact that such an adhesive improves the durability. The aforementioned water-based adhesive is usually used as an adhesive in the form of an aqueous solution and contains a solid contend of 0.5 to 60 wt. %.

For the active energy ray curable adhesive, a compound having a mono-functional, di-functional, or poly-functional (meth)acryloyl group or a compound having a vinyl group may be used as its curing component. Alternatively, a photo-cation type curing component mainly including an epoxy compound or an oxetane compound and a photo-acid generating agent can also be used. As the active energy ray, an electron beam or an ultraviolet ray can be used.

Further, the adhesive may contain a metallic compound filler. The use of the metallic compound filler can control the fluidity of the adhesive layer, thus making it possible to obtain a polarizing plate having a stable film thickness, an excellent external appearance, a uniform in-surface property, and no or small variations in the adhesiveness.

There is no particular restriction on the method for forming an adhesive layer. For example, an adhesive layer can be formed by applying the aforementioned adhesive to an object to be adhered and then heating or drying the applied adhesive. The adhesive may be applied to a polarizer protection film or an optical film according to the present invention, or applied to a polarizer. After the adhesive layer is formed, the polarizer protection film or the optical film and the polarizer are laminated on each other by pressing them to each other. For the laminating process, a roll-press machine, a plate-press machine, or the like can be used. The heat-drying temperature or the drying temperature may be determined as appropriate according to the type of the adhesive. The thickness of the adhesive layer in a dried state is preferably 0.01 to 10 µm and more preferably 0.03 to 5 µm.

An easy adhesive layer that can be provided in a polarizing plate according to the present invention improves the adhesiveness of the surface on which a polarizer protection film and a polarizer are brought into contact with each other. The easy adhesive layer can be formed by an easy adhesive process or the like. Examples of the easy adhesive process include surface treatments such as a corona treatment, a plasma treatment, and a low-pressure UV treatment. Alternatively, the easy adhesive layer can be formed by a method for forming an anchor layer or a combined use of the aforementioned surface treatment and the method for forming an anchor layer. Among them, the corona treatment, the method for forming an anchor layer, and the combined use of them are preferred.

Examples of the aforementioned anchor layer include a silicone layer having a reactive functional group. There is no particular restriction on the silicone layer having a reactive functional group. However, examples of the silicone layer having a reactive functional group include alkoxy silanols containing an isocyanate group, alkoxy silanols containing an amino group, alkoxy silanols containing a mercapto group, alkoxy silanols containing a carboxy group, alkoxy silanols containing an epoxy group, alkoxy silanols containing a vinyl-type unsaturated group, alkoxy silanols containing a halogen group, and alkoxy silanols containing an isocyanate group. Among them, amino-based silanols are preferred. The adhesive force can be strengthened by adding, in the aforementioned silanol, a titanium-based catalyst or a tin-based catalyst, which is used for an efficient reaction of the silanol. Further, other additives may be added in the aforementioned silicone having a reactive functional group. Examples of the other additive include tackifiers such as terpene resins, phenol resins, terpene-phenolic resins, rosin resins, and xylene resins; and stabilizers such as ultraviolet absorbers, antioxidants, and heat-resistant stabilizers. Further, examples of the anchor layer include a layer that is formed by saponifying a cellulose acetate butyrate resin.

The aforementioned anchor layer is formed by performing an applying process (or a coating process) and a drying process by using well-known techniques. The thickness of the anchor layer in a dried state is preferably 1 to 100 nm and more preferably 10 to 50 nm. In the applying process, the anchor layer formation chemical liquid may be diluted by a solvent. There is no particular restriction on the diluting solvent and examples thereof include alcohols. There is no particular restriction on the dilution concentration. However, the dilution concentration is preferably 1 to 5 wt. % and more preferably 1 to 3 wt. %.

The optical film 16 may be a polarizer protection film according to the present invention or may be other arbitrary appropriate optical films. There is no particular restriction on the used optical film. Examples of the optical film include films made of a cellulose resin, a polycarbonate resin, a cyclic polyolefin resin, and a methacrylic resin.

The cellulose resin is an ester of cellulose and a fatty acid. Therefore, specific examples of the cellulose ester-based resin include cellulose triacetate, cellulose diacetate, cellulose tripropionate, and cellulose dipropionate. Among them, the cellulose triacetate is particularly preferred. A number of products of cellulose triacetate are on the market and hence it is advantageous because it is easily acquired and in view of the cost. Examples of the cellulose triacetate on the market include Trade names "UV-50", "UV-80", "SH-80", "TD-80U", "TD-TAC" and "UZ-TAC" manufactured by Fujifilm Corporation, and "KC series" manufactured by Konica Minolta, Inc.

The cyclic polyolefin resin is a general term for resins that are obtained by polymerizing cyclic olefin as a polymerization unit. Examples of the cyclic polyolefin resin include those mentioned in Japanese Unexamined Patent Application Publications No. H1-240517, No. H3-14882, and No. H3-122137. Specific examples of the cyclic polyolefin resin include: open-circular (co)polymers of cyclic olefin, addition polymers of cyclic olefin, a combination of cyclic olefin and ethylene, α-olefins such as propene and their copolymers (typically, random copolymers), and graft copolymers obtained by denaturing these polymers with an unsaturated carboxylic acid or its derivative; and hydrides of these polymers. Specific examples of the cyclic olefin include norbornene-based monomers.

Various products of the cyclic polyolefin resin are on the market. Specific examples of them include Trade names "Zeonex" and "Zeonor" manufactured by Nippon Zeon Co., Ltd., Trade name "Arton" manufactured by JSR Corporation, Trade name "TOPAS" manufactured by Polyplastics Co., Ltd., and Trade name "APEL" manufactured by Mitsui Chemicals Co., Ltd.

As the methacrylic resin used for an optical film such as the optical film 16, an arbitrary appropriate methacrylic resin can be used as long as the effects of the present invention are not impaired. Examples of the methacrylic resin include polymethacrylic acid esters such as polymethyl methacrylate, methyl methacrylate-(meth)acrylic acid copolymers, methyl methacrylate-(meth)acrylic acid ester copolymers, methyl methacrylate-acrylic acid ester-(meth)acrylic acid copolymers, methyl (meth)acrylate-styrene copolymers (such as MS resins), and polymers having an alicyclic hydrocarbon group (such as methyl methacrylate-cyclohexyl methacrylate copolymers and methyl methacrylate-norbornyl (meth)acrylate copolymers).

Examples of the methacrylic resin used for an optical film such as the optical film 16 include Acrypet VH and Acrypet VRL20A manufactured by Mitsubishi Rayon Co., Ltd., an acrylic resin obtained by copolymerizing methyl methacrylate and a maleimide-based monomer disclosed in Japanese Unexamined Patent Application Publication No. 2013-033237 or International Patent Publication No. WO2013/005634, an acrylic resin having a ring structure in a molecule disclosed in International Patent Publication No. WO2005/108438, a methacrylic resin having a ring structure in a molecule disclosed in Japanese Unexamined Patent Application Publication No. 2009-197151, and a methacrylic resin having a high glass transition temperature (Tg) obtained by in-molecule cross-linking or an in-molecule cyclization reaction.

A methacrylic resin having a lactone ring structure can also be used as the methacrylic resin used for the optical film 16. This is because the methacrylic resin having a lactone ring structure has a high heat resistance and high transparency, and has a high mechanical strength when it is biaxially-stretched.

Examples of the aforementioned methacrylic resin having a lactone ring structure include methacrylic resins having a lactone ring structure disclosed in Japanese Unexamined Patent Application Publications No. 2000-230016, No. 2001-151814, No. 2002-120326, No. 2002-254544, and No. 2005-146084.

A polarizing plate according to the present invention can be used for an image display device. Examples of the image display device include self-light-emitting type display devices such as electroluminescent (EL) displays, plasma displays (PDs), field emission displays (FEDs: Field Emission Displays), and liquid crystal display devices. A liquid crystal display device includes liquid crystal cells and the aforementioned polarizing plate disposed on at least one side of the liquid crystal cells.

According to the methacrylic resin composition in accordance with the present invention, since the methacrylic resin and the polycarbonate resin are uniformly dissolved (or uniformly compatible) to each other, the transparency is high and the phase difference in the thickness direction is small even after being stretched. Further, a film obtained therefrom has a high stretching property. Therefore, in a preferred exemplary embodiment, a thin film having excellent in-surface uniformness and high surface smoothness can be obtained. Further, a film having a high strength is obtained because the film can be stretched at a low temperature. Further, by adjusting the syndiotacticity (rr) of the methacrylic resin to a specific range, a film having a high heat resistance and a small thermal shrinkage ratio as well as the above-described advantageous effects can be provided.

EXAMPLES

The present invention is explained in a more concrete manner hereinafter by using examples and comparative examples. However, the present invention is not limited to the blow-shown examples. Note that physical properties and the like were measured in accordance with the below-described methods.

(Polymerization Conversion Ratio)

Inert CAP 1 (df=0.4 μm, 0.25 mm I.D.×60 m) manufactured by GL Sciences Inc. was connected as a column to a gas chromatograph GC-14A manufactured by Shimadzu Corporation. The created contrivance was set to the condition that: an injection temperature was 180° C.; a detector temperature was 180° C.; and a column temperature was raised (after keeping at 60° C. for 5 minutes) from 60° C. to 200° C. at a temperature-raising rate of 10° C./minute, and kept at 200° C. for 10 minutes. Then, measurement was carried out. A polymerization conversion ratio was calculated based on the result of this measurement.

(Weight-Average Molecular Weight (Mw), Molecular Weight Distribution (Mw/Mn))

For the value MW and the molecular weight distribution of a methacrylic resin and a methacrylic resin composition obtained in each of manufacturing examples, examples, and comparative examples, chromatograms were measured (i.e., obtained) by gel permeation chromatography (GPC) under the below-shown condition and values converted into molecular weights of standard polystyrene were calculated. A line connecting a point at which the inclination of the peak on the high molecular weight side in a GPC chart changes from zero to a positive side as viewed from an earlier side of a holding time to a point at which the inclination of the peak on the low molecular weight side changes from zero to a negative side as viewed from the earlier side of the holding time was defined as a baseline.

GPC device: HLC-8320 manufactured by Tosoh Corporation.

Detector: differential refractive index detector

Column: two TSK gel SuperMultipore HZM-M and SuperHZ4000 manufactured by Tosoh Corporation, which were connected in series Eluent: tetrahydrofuran Eluent flow rate: 0.35 mL/minute Column temperature: 40° C.

Calibration curve: created by using 10 data points of standard polystyrene (Viscosity-Average Molecular Weight (Mv))

The viscosity-average molecular weight of a polycarbonate resin was obtained by measuring the specific viscosity ηsp of a solution obtained by dissolving 0.5 g of a polycarbonate resin in 100 mL of methylene chloride at 20° C. by using an Ubbelohde viscometer and calculating a value that satisfies the below-shown Schnell expression from the limiting viscosity [η] of the methylene chloride solution at 20° C.

$$\eta_{sp}/c = [\eta] + 0.45 \times [\eta]^2 c$$

(Note that [η] is the limiting viscosity, and c=0.5 under the above-described condition.)

$$[\eta] = 1.23 \times 10^{-4} Mv^{0.83}$$

(Triad Syndiotacticity (rr))

A $^1$H-NMR spectrum of a methacrylic resin was measured by using a nuclear magnetic resonance device (ULTRA SHIELD 400 PLUS manufactured by Bruker Corporation) by using deuterochloroform as a solvent at a room temperature on the condition that a cumulative number of times was 64. The size (X) of an area of 0.6 to 0.95 ppm and the size (Y) of an area of 0.6 to 1.35 ppm when the TMS was 0 ppm were measured (i.e., obtained) from the aforementioned spectrum. Then, a triad syndiotacticity (rr) was calculated by using a formula: (X/Y)×100.

(Glass Transition Temperature Tg)

A DSC curve was measured (i.e., obtained) by using a differential scanning calorimeter (DCS-50 (product number) manufactured by Shimadzu Corporation) in conformity to JIS K7121 under the condition that a methacrylic resin, a polycarbonate resin, and a methacrylic resin composition were temporarily heated to 230° C., then cooled to a room temperature, and after that, heated from the room temperature to 230° C. at a rate of 10° C./minute. A middle glass transition temperature obtained from a DSC curve that was measured (i.e., obtained) in the second temperature raising process was defined as a glass transition temperature in the present invention.

(Melt Mass-Flow Rate (MFR))

A methacrylic resin, which was an ingredient for a methacrylic resin composition used for the manufacturing of a film in each of the examples and comparative examples was measured under the condition of a load of 3.8 kg, a temperature of 230° C., and a measuring time of 10 minutes in conformity to JIS K7210.

(Melt Volume-Flow Rate (MVR))

A polycarbonate resin, which was an ingredient for a methacrylic resin composition used for the manufacturing of a film in each of the examples and comparative examples was measured under the condition of a load of 1.2 kg, a temperature of 300° C., and a measuring time of 10 minutes in conformity to JIS K7210.

(Film Thickness Stability)

An average thickness over 10 mm at the center in the width direction perpendicular to the extruding direction of an unstretched film obtained by each of the examples and comparative examples was defined as a central-part thickness (TC). An average thickness over 10 mm from a point 15 mm away from one end of the unstretched film to a point 25 mm away from that end was defined as a thickness at one end, and an average value of thicknesses at both ends was defined as an end thickness (TS).

Then, a difference between the end thickness (TS) and the central-part thickness (TC) was obtained and film thickness stability (or film thickness uniformity) was evaluated based on the below-shown criteria. A thickness was measured by using a micrometer. A film thickness was measured and was evaluated based on the below-shown criteria.

A: A difference between the end thickness (TS) and the central-part thickness (TC) is less than 3 µm; and B: A difference between the end thickness (TS) and the central-part thickness (TC) is not less than 3 µm.

(Tensile Strength)

A test strip having a shape of a type 1B was cut out from an unstretched film obtained by each of the examples and comparative examples in conformity to JIS K7127. Then, a tensile yield strength in the extruding direction of the film was measured at a pulling speed of 20 mm/min and evaluated based on the below-shown criteria.

A: A tensile yield strength is not less than 70 MPa; and

B: A tensile yield strength is less than 70 MPa.

(Surface Smoothness)

The surface of a biaxially-stretched film obtained by each of the examples and comparative examples was visually observed and surface smoothness was evaluated based on the below-shown criteria.

A: A surface is smooth; and

B: A surface is uneven.

(Thermal Shrinkage Ratio)

A test strip having a size of 100 mm×30 mm was cut out from a biaxially-stretched film obtained by each of the examples and comparative examples. Then, a straight line having a length of 70 mm was drawn on its surface. After the test strip was heated for 30 minutes in a forced hot-air circulating-type constant-temperature oven kept at 110° C., the length (L (mm)) of the drawn straight line was measured by a scale and a thermal shrinkage ratio was obtained by using the below-shown expression.

Thermal shrinkage ratio(%)=(70−$L$)/70×100

(Total Light Transmittance)

A test strip having a size of 50 mm×50 mm was cut out from a biaxially-stretched film obtained by each of the examples and comparative examples. Then, a total light transmittance of the test strip was measured by using a haze meter (HM-150 manufactured by Murakami Color Research Laboratory Co., Ltd.) in conformity to JIS K7361-1. Further, as the evaluation of a methacrylic resin composition, a molded article having a thickness of 1.0 mm was molded by a thermal press and a total light transmittance of the molded article was measured.

(Haze)

A test strip having a size of 50 mm×50 mm was cut out from a biaxially-stretched film obtained by each of the examples and comparative examples. Then, a haze of the test strip was measured by using a haze meter (HM-150 manufactured by Murakami Color Research Laboratory Co., Ltd.) in conformity to JIS K7136. Further, as the evaluation of a methacrylic resin composition, a molded article having a thickness of 1.0 mm was molded by a thermal press and a haze of the molded article was measured.

(Thickness Direction Phase Difference Rth and In-surface Phase Difference Re)

A test strip having a size of 40 mm×40 mm was cut out from a biaxially-stretched film obtained by each of the examples and comparative examples. Three-dimensional refractive indexes nx, ny and nz of this test strip were obtained from a phase difference value in a 40°-inclined direction at a wavelength of 590 nm at a temperature of 23±2° C. at a humidity of 50±5% by using an automatic double-refraction meter (KOBRA-WR manufactured by Oji Scientific Instruments). A thickness direction phase difference Rth and an in-surface phase difference Re were calculated by using the above-shown expression. The thickness d (nm) of the test strip was measured by using a Digimatic Indicator (manufactured by Mitutoyo Corporation) and the refractive index n of the test strip was measured by using a digital precision refractometer (KPR-20 manufactured by Kalnew Optical Industry Co., Ltd.).

(Stretching Property)

When an unstretched film obtained by each of the examples and comparative examples was biaxially-stretched, its stretching property was evaluated based on the below-shown criteria.

A: Among ten samples, at least five samples that have no cracks were obtained; and B: Among ten samples, less than five samples that have no cracks were obtained.

Manufacturing Example 1

Air in a glass reactor vessel having a volume of 5 L, to which a stirring blade and a three-way cock were attached, was replaced by nitrogen. At a room temperature, 1,600 g of toluene, 2.49 g (10.8 mmol) of 1,1,4,7,10,10-hexamethyl triethylenetetramine, 53.5 g (30.9 mmol) of a toluene solution of isobutylbis(2,6-di-t-butyl-4-methylphenoxy) aluminum having a concentration of 0.45 M, and 6.17 g (10.3 mmol) of a sec-butyl lithium solution (solvent: 95 mass % of cyclohexane, 5 mass % of n-hexane) having a concentration of 1.3 M were charged (or introduced) into this reactor vessel. Then, 550 g of methyl methacrylate, which was distilled and purified in advance, was dropped into this reactor vessel at −20° C. over 30 minutes while stirring the content. After the dropping, the content was stirred at −20° C. for 180 minutes. The solution, which was originally yellow, became colorless. At this point, the polymerization conversion ratio of the methyl methacrylate was 100%.

The obtained solution was diluted by adding 1,500 g of toluene. Next, the diluted solution was poured into 100 kg of methanol and a precipitate was obtained. The obtained precipitate was dried at 80° C. at 140 Pa for 24 hours. As a result, a methacrylic resin [PMMA1] having a value MW of 96,100, a molecular weight distribution of 1.07, a syndiotacticity (rr) of 83%, a glass transition temperature of 133° C., and a ratio of a structure unit originating in the methyl methacrylate of 100 mass % was obtained.

Manufacturing Example 2

Air in a glass reactor vessel having a volume of 5 L, to which a stirring blade and a three-way cock were attached, was replaced by nitrogen. At a room temperature, 1,600 g of toluene, 2.49 g (10.8 mmol) of 1,1,4,7,10,10-hexamethyl triethylenetetramine, 53.5 g (30.9 mmol) of a toluene solution of isobutylbis(2,6-di-t-butyl-4-methylphenoxy) aluminum having a concentration of 0.45 M, and 6.17 g (10.3 mmol) of a sec-butyl lithium solution (solvent: 95 mass % of cyclohexane, 5 mass % of n-hexane) having a concentration of 1.3 M were charged (or introduced) into this reactor vessel. Then, 550 g of methyl methacrylate, which was distilled and purified in advance, was dropped into this reactor vessel at 20° C. over 30 minutes while stirring the content. After the dropping, the content was stirred at 20° C. for 90 minutes. The solution, which was originally yellow, became colorless. At this point, the polymerization conversion ratio of the methyl methacrylate was 100%.

The obtained solution was diluted by adding 1,500 g of toluene. Next, the diluted solution was poured into 100 kg of methanol and a precipitate was obtained. The obtained precipitate was dried at 80° C. at 140 Pa for 24 hours. As a result, a methacrylic resin [PMMA2] having a value MW of 81,400, a molecular weight distribution of 1.08, a syndiotacticity (rr) of 73%, a glass transition temperature of 131° C., and a content of a structure unit originating in the methyl methacrylate of 100 mass % was obtained.

Manufacturing Example 3

Air in an autoclave, to which a stirrer and a collecting tube were attached, was replaced by nitrogen. An ingredient solution was obtained by putting (or introducing) 100 pts-.mass of purified methyl methacrylate, 0.0052 pts.mass of 2,2'-azobis(2-methyl propionitrile) (hydrogen abstraction ability: 1%, one-hour half-life temperature: 83° C.), and 0.28 pts.mass of n-octyl mercaptan into this autoclave and stirring the content. Dissolved oxygen in the ingredient solution was removed by feeding nitrogen into the ingredient solution.

The ingredient solution was put into a bath-type reactor, which was connected to the autoclave through piping, so that two thirds of the bath-type reactor was filled with the ingredient solution. Firstly, a batch-type polymerization reaction was started while keeping the temperature at 140° C. When the polymerization conversion ratio becomes 55 mass %, the polymerization reaction was changed to a continuous flow type polymerization reaction by supplying the ingredient solution from the autoclave to the bath-type reactor at such a flow rate that the average residence time became 150 minutes and pulling out the reaction solution from the bath-type reactor at a flow rate corresponding to the flow rate at which the ingredient solution was supplied while keeping the temperature at 140° C. After the change of the polymerization reaction, the polymerization conversion ratio in a steady state was 55 mass %.

The reaction solution pulled out from the bath-type reactor, which was in the steady state at that point, was supplied to a multi-pipe type heat exchanger having an internal temperature of 230° C. at such a flow rate that the average residence time became 2 minutes and heated in the multi-pipe type heat exchanger. Next, a molten resin was obtained by introducing the heated reaction solution into a heated flash vaporizer and thereby removing a volatile component that included unreacted monomers as the main component. The melted resin, from which the volatile component was removed, was supplied to a twin screw extruder having an internal temperature of 260° C. and discharged therefrom in a strand state. Then, the discharged resin was cut by a pelletizer. As a result, pellets of a methacrylic resin [PMMA3] having a value MW of 82,000, a molecular weight distribution of 1.85, a syndiotacticity (rr) of 52%, a glass transition temperature of 120° C., and a content of a structure unit originating in the methyl methacrylate of 100 mass % was obtained.

Manufacturing Example 4

The same operations as those in the Manufacturing Example 3 except that the amount of n-octyl mercaptan was changed to 0.225 pts.mass were performed. As a result, a methacrylic resin [PMMA4] having a value MW of 103,600, a molecular weight distribution of 1.81, a syndiotacticity (rr) of 52%, a glass transition temperature of 120° C., and a content of a structure unit originating in the methyl methacrylate of 100 mass % was obtained.

Manufacturing Example 5

The same operations as those in the Manufacturing Example 3 except that the amount of n-octyl mercaptan was changed to 0.30 pts.mass were performed. As a result, a methacrylic resin [PMMA5] having a value MW of 76,400, a molecular weight distribution of 1.81, a syndiotacticity (rr) of 53%, a glass transition temperature of 119° C., and a content of a structure unit originating in the methyl methacrylate of 100 mass % was obtained.

Manufacturing Example 6

A methacrylic resin [PMMA6] was manufactured by mixing 57 pts.mass of the methacrylic resin [PMMA2] and 43 pts.mass of the methacrylic resin [PMMA4], and kneading and extruding the mixture at 250° C. by using a twin screw extruder (Trade name: KZW20TW-45MG-NH-600 manufactured by Technovel Corporation).

Sumipex MHF (Sumitomo Chemical Co., Ltd.) was used as a methacrylic resin [PMMA7].

Table 1 shows physical properties of the above-described methacrylic resins [PMMA1] to [PMMA7].

TABLE 1

|  | Manufacturing Example 1 | Manufacturing Example 2 | Manufacturing Example 3 | Manufacturing Example 4 | Manufacturing Example 5 | Manufacturing Example 6 | Manufacturing Example 7 |
|---|---|---|---|---|---|---|---|
| Methacrylic resin | PMMA1 | PMMA2 | PMMA3 | PMMA4 | PMMA5 | PMMA6 | PMMA7 |
| MMA unit conent [mass %] | 100 | 100 | 100 | 100 | 100 | 100 | 98.7 |
| Weight-average molecular weight [g/mol] | 96,100 | 81,400 | 82,000 | 103,600 | 76,400 | 88,600 | 86,600 |
| Molecular-weight distribution | 1.07 | 1.08 | 1.85 | 1.81 | 1.81 | 1.32 | 1.78 |
| Triad syndiotacticity (rr) [%] | 83 | 73 | 52 | 52 | 53 | 62 | 46 |
| Glass Transition temperature [° C.] | 133 | 131 | 120 | 120 | 119 | 126 | 116 |

Polycarbonate resins used in the examples are described hereinafter. Further, Table 2 shows their physical properties.

PC1: Panlite AD-5503 (product number) manufactured by Teijin Limited, MVR (300° C., 1.2 Kg)=54 cm$^3$/10 minutes, Mv=15,200

PC2: Tarflon LC1700 (product number) manufactured by Idemitsu Kosan Co., Ltd., MVR (300° C., 1.2 Kg)=40 cm$^3$/10 minutes, Mv=16,200

PC3: Iupilon HL4000 (product number) manufactured by Mitsubishi Engineering-Plastics Corporation, MVR (300° C., 1.2 Kg)=60 cm$^3$/10 minutes, Mv=15,100

PC4: SD POLYCA SD-2201W (product number) manufactured by Sumika Styron Polycarbonate Limited, MVR (300° C., 1.2 Kg)=115 cm$^3$/10 minutes, Mv=13,000

PC5: SD POLYCA TR-2001 (product number) manufactured by Sumika Styron Polycarbonate Limited, MVR (300° C., 1.2 Kg)=200 cm$^3$/10 minutes, Mv=11,400

PC6: DVD1080 (product number) manufactured by Dow Chemical Company, MVR (300° C., 1.2 Kg)=80 cm$^3$/10 minutes, Mv=14,100

PC7: CALIBRE 301-22 (product number) manufactured by Sumika Styron Polycarbonate Limited, MVR (300° C., 1.2 Kg)=22 cm$^3$/10 minutes, Mv=18,800

TABLE 2

| Polycarbonate resin | PC1 | PC2 | PC3 | PC4 | PC5 | PC6 | PC7 |
|---|---|---|---|---|---|---|---|
| MVR (300° C. 1.2 Kg) [cm$^3$/10 minutes] | 54 | 40 | 60 | 115 | 200 | 80 | 22 |
| Weight-average molecular weight [g/mol] | 28,900 | 32,800 | 28,100 | 27,200 | 22,100 | 28,800 | 39,000 |
| Molecular-weight distribution | 1.91 | 2.06 | 1.91 | 1.87 | 1.81 | 1.92 | 2.06 |
| Viscosity-average molecular weight | 15,200 | 16,200 | 15,100 | 13,000 | 11,400 | 14,100 | 18,800 |
| Glass transition temperature [° C.] | 146 | 147 | 145 | 144 | 141 | 145 | 150 |

As an ultraviolet absorber, 2,4,6-tris(2-hydroxy-4-hexyloxy-3-methylphenyl)-1,3,5-triazine (LA-F70 manufactured by ADEKA Corporation) was used.

Example 1

A methacrylic resin composition [1] was manufactured by mixing 100 pts.mass of the methacrylic resin [PMMA1] and 2.6 pts.mass of the polycarbonate resin [PC1], and kneading and extruding the mixture at 250° C. by using a twin screw extruder (Trade name: KZW20TW-45MG-NH-600 manufactured by Technovel Corporation). A plate-like molded article having a size of 50 mm×50 mm×1.0 mm was molded from the obtained methacrylic resin composition [1] by thermal-press molding. Then, the total light transmittance, the haze, and the glass transition temperature of the plate-like molded article were measured. Table 3 shows physical properties of the methacrylic resin composition [1].

The methacrylic resin composition [1] was dried at 80° C. for 12 hours. By using a single screw extruder having a diameter of 20 mmφ (manufactured by OCS Compaany), an unstretched film having a width of 110 mm and a thickness of 160 μm was obtained by extruding the methacrylic resin composition [1] from a T-die having a width of 150 mm at a resin temperature of 260° C. and pulling out the extruded methacrylic resin composition by using rolls having a surface temperature of 85° C. Table 3 shows measured film thickness stability and a measured strength of the obtained unstretched film.

A strip having a size of 100 mm×100 mm was cut out from the unstretched film obtained by the above-described technique. Then, a biaxially-stretched film having a thickness of 40 μm was obtained, by using a pantograph-type biaxial-stretching tester (manufactured by Toyo Seiki Co., Ltd.), by successively biaxially-stretching the strip in a stretching ratio of two in one direction (four as expressed in an area ratio) at a stretching temperature that was 15° C. higher than the glass transition temperature at a stretching speed of 500%/minute in one direction, cooling the strip to 100° C. or lower over two minutes, and removing the cooled stretched strip from the pantograph-type biaxial-stretching teste. Table 3 shows the surface smoothness, the thermal shrinkage ratio, the total light transmittance, the haze, the in-surface phase difference Re, and the thickness direction phase difference Rth of the obtained biaxially-stretched film. Further, Table 3 also shows the stretching property of the biaxially-stretched film when the stretched film was manufactured from the unstretched film.

Examples 2-9, Comparative Examples 1-7

Methacrylic resin compositions [2] to [16] were manufactured by the same method as that of Example 1 except that formulations shown in Tables 3 and 4 were used. A plate-like molded article having a size of 50 mm×50 mm×1.0 mm was molded from each of the obtained methacrylic resin compositions [2] to [16] by thermal-press molding. Then, the total light transmittance, the haze, and the glass transition temperature of the plate-like molded article were measured. Tables 3 and 4 show physical properties of the methacrylic resin compositions [2] to [16].

Unstretched films and biaxially-stretched films were obtained by the same method as that of Example 1 except that the methacrylic resin compositions [2] to [16] were used instead of using the methacrylic resin composition [1]. Tables 3 and 4 show evaluation results.

TABLE 3

| | | Examples | | | | | | | | |
|---|---|---|---|---|---|---|---|---|---|---|
| | | 1 | 2 | 3 | 4 | 5 | 6 | 7 | 8 | 9 |
| | | Resin composition | | | | | | | | |
| | | [1] | [2] | [3] | [4] | [5] | [6] | [7] | [8] | [9] |
| Ingredients of resin composition [pts · mass] | PMMA1 | 100 | 100 | | | | | | | |
| | PMMA2 | | | 100 | | | | | | |
| | PMMA3 | | | | 100 | | | | | |
| | PMMA4 | | | | | 100 | | | | |
| | PMMA5 | | | | | | 100 | | | |
| | PMMA6 | | | | | | | 100 | 100 | 100 |
| | PMMA7 | | | | | | | | | |
| | PC1 | 2.6 | | | | | | | | |
| | PC2 | | 2.6 | 2 | | | | 2.3 | | |
| | PC3 | | | | 2 | 2 | 2 | | 4 | |
| | PC4 | | | | | | | | | |
| | PC5 | | | | | | | | | |
| | PC6 | | | | | | | | | |
| | PC7 | | | | | | | | | 2 |
| | Ultraviolet absorber | | | | | 0.7 | | 0.7 | | |
| Evaluation of resin composition | Total light transmittance [%] | 92 | 92 | 92 | 92 | 92 | 92 | 92 | 91 | 91 |
| | Haze [%] | 0.4 | 0.4 | 0.3 | 0.3 | 0.3 | 0.3 | 0.4 | 0.8 | 1.0 |
| | Molecular-weight distribution | 1.18 | 1.18 | 1.15 | 1.90 | 1.89 | 1.85 | 1.40 | 1.46 | 1.37 |
| | Weight-average molecular weight [g/mol] | 94,400 | 94,500 | 80,400 | 80,900 | 102,100 | 75,500 | 87,300 | 86,300 | 87,600 |
| | Glass transition temperature [° C.] | 133 | 133 | 131 | 121 | 121 | 120 | 126 | 126 | 126 |
| Unstretched film | Film thickness [μm] | 160 | 160 | 160 | 160 | 160 | 160 | 160 | 160 | 160 |
| | Film thickness stability | B | B | B | A | A | A | A | A | A |
| | Tensile strength | A | A | A | B | B | B | A | A | A |
| Biaxially-stretched film | Film thickness of stretched film [μm] | 40 | 40 | 40 | 40 | 40 | 40 | 40 | 40 | 40 |
| | Surface smoothness | A | A | A | A | A | A | A | A | A |
| | Thermal shrinkage ratio [%] | 0.3 | 0.3 | 0.4 | 2.8 | 2.9 | 3.0 | 1.0 | 0.9 | 0.9 |
| | Rth [nm] | 1.6 | 1.9 | −0.6 | −0.4 | −0.8 | −0.8 | 0.6 | 6.7 | −0.5 |
| | Re [nm] | −0.5 | 0.4 | 0.1 | −0.1 | −0.2 | 0.3 | 0.6 | −0.4 | 0.3 |
| | Total light transmittance [%] | 9.2 | 92 | 92 | 92 | 92 | 92 | 92 | 92 | 92 |
| | Haze [%] | 0.1 | 0.1 | 0.1 | 0.1 | 0.1 | 0.1 | 0.1 | 0.2 | 0.2 |
| | Stretching property | A | A | A | A | A | A | A | A | A |
| | Stretching temperature | Tg + 15 | Tg + 15 | Tg + 15 | Tg + 15 | Tg + 15 | Tg + 15 | Tg + 15 | Tg + 15 | Tg + 15 |

TABLE 4

| | | Comparative Examples | | | | | | |
|---|---|---|---|---|---|---|---|---|
| | | 1 | 2 | 3 | 4 | 5 | 6 | 7 |
| | | Resin composition | | | | | | |
| | | [10] | [11] | [12] | [13] | [14] | [15] | [16] |
| Ingredients of resin composition [pts · mass] | PMMA1 | | | | | | | |
| | PMMA2 | 100 | | | | | | |
| | PMMA3 | | 100 | | | | | |
| | PMMA4 | | | | | | | |
| | PMMA5 | | | | | | | |
| | PMMA6 | | | 100 | 100 | 100 | 100 | |
| | PMMA7 | | | | | | | 100 |

TABLE 4-continued

| | | Comparative Examples | | | | | | |
|---|---|---|---|---|---|---|---|---|
| | | 1 | 2 | 3 | 4 | 5 | 6 | 7 |
| | | Resin composition | | | | | | |
| | | [10] | [11] | [12] | [13] | [14] | [15] | [16] |
| | PC1 | | | | | | | |
| | PC2 | | | | | | | |
| | PC3 | | | 4.2 | | | | |
| | PC4 | | | | 2 | | | 3.1 |
| | PC5 | | | | | 2 | | |
| | PC6 | | | | | | 2 | |
| | PC7 | | | | | | | |
| | Ultraviolet absorber | | | | | | | |
| Evaluation of resin composition | Total light transmittance [%] | 92 | 92 | 91 | 92 | 92 | 92 | 92 |
| | Haze [%] | 0.2 | 0.2 | 1.1 | 0.3 | 0.3 | 0.3 | 0.3 |
| | Molecular-weight distribution | 1.08 | 1.85 | 1.47 | 1.39 | 1.42 | 1.39 | 1.87 |
| | Weight-average molecular weight [g/mol] | 81,400 | 82,000 | 86,200 | 87,400 | 87,300 | 87,400 | 84,800 |
| | Glass transition temperature [° C.] | 131 | 120 | 126 | 126 | 126 | 126 | 116 |
| Unstretched film | Film thickness [μm] | 160 | 160 | 160 | 160 | 160 | 160 | 160 |
| | Film thickness stability | B | A | A | A | A | A | A |
| | Tensile strength | A | B | A | A | A | A | B |
| Biaxially-stretched film | Film thickness of stretched film [μm] | 40 | 40 | 40 | 40 | 40 | 40 | 40 |
| | Surface smoothness | B | B | A | B | B | B | B |
| | Thermal shrinkage ratio [%] | 0.4 | 3.0 | 0.9 | 0.9 | 0.9 | 0.9 | 4.1 |
| | Rth [nm] | −14.3 | −13.8 | 10.5 | −1.6 | −3.3 | −1.1 | 2.9 |
| | Re [nm] | −0.8 | −0.9 | 0.4 | 0.3 | −0.2 | 0.2 | 0.3 |
| | Total light transmittance [%] | 92 | 92 | 92 | 92 | 92 | 92 | 92 |
| | Haze [%] | 0.1 | 0.1 | 0.3 | 0.1 | 0.1 | 0.1 | 0.1 |
| | Stretching property | B | B | A | B | B | B | B |
| | Stretching temperature | Tg + 15 | Tg + 15 | Tg + 15 | Tg + 15 | Tg + 15 | Tg + 15 | Tg + 15 |

(Polarizer)

A polivinyl alcohol film having an average polymerization level of 2,400, a saponification level of 99.9 mole %, and a thickness of 75 μm was swelled by submerging it in warm water at 30° C. for 60 seconds. Next, the swelled film was stretched to a size of 3.5 times larger than the original size while dyeing it in an iodine solution having a concentration of 0.3 wt. % (weight ratio: iodine/potassium iodide=0.5/8) at 30° C. for one minute. After that, the film was further stretched so that the total stretching ratio became 6 while submerging it in a boric acid solution having a concentration of 4 wt. % at 65° C. for 0.5 minute. After the stretching, a polarizer having a thickness of 22 μm was obtained by drying the film in an oven at 70° C. for three minutes.

(Manufacturing of Polarizing Plate X)

The biaxially-stretched film of Example 7 was used as a polarizer protection film A.

An easy adhesive composition was obtained by mixing 16.8 g of polyester urethane (Trade name: Superflex 210 manufactured by DKS Co. Ltd., solid content: 33%), 4.2 g of cross-linking agent (polymer containing oxazoline, Trade name: Epocros WS-700 manufactured by Nippon Shokubai Co., Ltd., solid content: 25%), 2.0 g of ammonia water having a concentration of 1 wt. %, 0.42 g of colloidal silica (Quartron PL-3 manufactured by Fuso chemical Co., Ltd., solid content: 20 wt. %), and 76.6 g of pure water.

The obtained easy adhesive composition was applied to a corona-discharge-treated surface of the biaxially-stretched film of Example 7, which was subjected to a corona discharge treatment, by using a bar-coater so that the thickness of the applied easy adhesive composition became 100 nm after being dried. After that, an easy adhesive layer was formed on the biaxially-stretched film of Example 7 by putting the film into a hot-air drier (110° C.) and thereby drying the easy adhesive composition for about five minutes.

Next, an active energy ray curable adhesive was obtained by mixing 38.3 pts.mass of N-hydroxyethyl acrylamide (Kojin Co., Ltd.), 19.1 pts.mass of tripropylene glycol diacrylate (Trade name: Aronix M-220 manufactured by Toagosei Co., Ltd.), 38.3 pts.mass of acryloyl morpholine (Kojin Co., Ltd.), and 1.4 pts.mass of a photo-polymerization initiator (Trade name: KAYACURE DETX-S, diethyl thioxanthone manufactured by Nippon Kayaku Co., Ltd.), and stirring the mixture at 50° C. for one hour.

The obtained active energy ray curable adhesive was applied to the easy adhesive layer side of the polarizer protection film A so that its thickness became 500 nm after being dried. After that, one polarizer protection film A was laminated on each side of the above-described polarizer with the active energy ray curable adhesive interposed therebetween by using a compact laminator. The polarizer was heated from both sides of the laminated polarizer protection films A to 50° C. by using an IR heater. Then, a polarizing plate X having transparent polarizer protection films laminated on both surfaces of its polarizer was obtained by irradiating these surfaces of the polarizer with ultraviolet rays with a cumulative dose of radiation of 1,000 mJ/cm2 and thereby curing the active energy ray curable adhesive. The manufactured polarizing plate X was put in a constant-temperature constant-humidity machine having a temperature of 80° C. and a relative humidity of 90%. After 100 hours had elapsed in that state, the level of degradation of the polarizer was visually observed and no degradation was recognized.

<Manufacturing of Polarizing Plate Y>

A polarizer protection film B was obtained by saponifying a triacetyl cellulose film having a thickness of 40 μm by submerging it in a sodium hydroxide aqueous solution having a concentration of 10% (60° C.) for 30 seconds and water-washing the saponified film for 60 seconds.

An aqueous solution having a solid-content concentration of 0.5% was obtained by dissolving 20 pts.mass of methylol melamine, based on 100 pts.mass of a polivinyl alcohol-based resin containing an acetoacetyl group (average polymerization level: 1,200, saponification level: 98.5 mole %, acetoacetyl group denatured level: 5 mole %), into pure water at a temperature of 30° C. The obtained aqueous solution was used as an adhesive composition at a temperature of 30° C.

Then, 30 minutes after the preparation of the above-described adhesive composition, the adhesive composition was applied to the polarizer protection film B so that its thickness became 50 nm after being dried. After that, one polarizer protection film B was laminated on each side of the above-described polarizer with the adhesive composition interposed therebetween by using a compact laminator. Then, a polarizing plate Y was obtained by putting the polarizer in a hot-air drier (70° C.) and thereby drying the adhesive composition for five minutes. The manufactured polarizing plate Y was put in a constant-temperature constant-humidity machine having a temperature of 80° C. and a relative humidity of 90%. After 100 hours had elapsed, the level of degradation of the polarizer was visually observed and degradation was recognized over the entire surface.

This application is based upon and claims the benefit of priority from Japanese patent application No. 2014-85965, filed on April 18, 2014, the disclosure of which is incorporated herein in its entirety by reference.

INDUSTRIAL APPLICABILITY

A methacrylic resin composition according to the present invention has high transparency, a high heat resistance, and a small phase difference, and capable of being stretched to a thin film. Therefore, the methacrylic resin composition according to the present invention is suitable for the use for polarizer protection films, phase difference films, liquid crystal protection plates, surface materials for mobile information terminals, display window protection films for mobile information terminals, light-guiding films, transparent conductive films in which silver nano-wires or carbon nano-tubes are applied to their surfaces, and front surface plates of various display devices. In particular, since a film according to present invention has a small phase difference, it is suitable for a polarizing plate film.

Since a film according to present invention has high transparency and a high heat resistance, it can be used for, besides the use for optical purposes, TR cut films, crime-prevention films, shatterproof films, decorative films, metal decorative films, back sheets for solar cells, front sheets for flexible solar cells, shrink films, and films for in-mold labels.

REFERENCE SIGNS LIST

11 POLARIZER
12 ADHESIVE LAYER
13 EASY ADHESIVE LAYER
14 POLARIZER PROTECTION FILM
15 ADHESIVE LAYER
16 OPTICAL FILM

The invention claim is:

1. A film, produced from a methacrylic resin composition comprising a methacrylic resin and a polycarbonate resin wherein in said methacrylic resin composition
    the polycarbonate resin has a viscosity-average molecular weight larger than 15,000 and smaller than 32,000,
    a content of the polycarbonate resin based on 100 parts by mass of the methacrylic resin is no less than 1 part by mass and no greater than 4 parts by pass, and
    a total amount of the methacrylic resin and the polycarbonate resin based on the methacrylic resin composition is 80 to 100 mass%
    a triad syndiotacticity (rr) of the methacrylic resin is no less than 58% and no greater than 65%, and
    a content of a structure unit originating in methyl methacrylate in the methacrylic resin is no less than 92 mass% and no greater than 100 mass%, and a molecular-weight distribution of the methacrylic resin composition is 1.3 to 1.5.

2. The film according to claim 1, wherein a thickness of the film is 10 to 50 μm.

3. The film according to claim 1, wherein the film is biaxially-stretched to a size of 1.5 to 8 times larger than an original size of the film as expressed in an area ratio.

4. The film according to claim 1, wherein the film is a polarizer protection film.

5. A polarizing plate, comprising
    at least one of the film according to claim 4 laminated thereon.

6. The film according to claim 1, wherein a molecular-weight distribution of the methacrylic resin composition is 1.37 to 1.46.

7. The film according to claim 1, wherein a content of a structure unit originating in methyl methacrylate in the methacrylic resin is no less than 99%.

8. The film according to claim 1, wherein a weight-average molecular weight of the methacrylic resin composition is 70,000 to 200,000.

9. The film according to claim 1, wherein the polycarbonate resin has a viscosity-average molecular weight of greater than 15,000 and less than 18,000.

10. The film according to claim 1, wherein the film is a stretched film.

11. The film according to claim 1, wherein the content of a structure unit originating in methyl methacrylate in the methacrylic resin is 100 mass%.

12. The film according to claim 1, wherein a thickness direction phase difference Rth expressed by the following expression (1) for light having a wavelength 590 nm is no less than −5 nm and no greater than 5 nm when the thickness of the film is 40 μm $$Rth = ((nx+ny)/2 - nz) \times d$$

wherein nx is a refractive index in a delayed-phase axis direction of the film; ny is a refractive index in an advanced-phase axis direction of the film; nz is a refractive index in a thickness direction of the film, and d (nm) is a thickness of the film.

* * * * *

UNITED STATES PATENT AND TRADEMARK OFFICE
CERTIFICATE OF CORRECTION

| | | |
|---|---|---|
| PATENT NO. | : 10,633,497 B2 | Page 1 of 1 |
| APPLICATION NO. | : 15/304970 | |
| DATED | : April 28, 2020 | |
| INVENTOR(S) | : Atsuhiro Nakahara et al. | |

It is certified that error appears in the above-identified patent and that said Letters Patent is hereby corrected as shown below:

On the Title Page

Item (73) should read:
-- (73) Assignee: KURARAY CO., LTD., Kurashiki-shi (JP) --

Signed and Sealed this
Thirtieth Day of June, 2020

Andrei Iancu
*Director of the United States Patent and Trademark Office*